(12) United States Patent
Minter

(10) Patent No.: US 7,979,363 B1
(45) Date of Patent: Jul. 12, 2011

(54) PRIORI PROBABILITY AND PROBABILITY OF ERROR ESTIMATION FOR ADAPTIVE BAYES PATTERN RECOGNITION

(76) Inventor: Thomas Cecil Minter, Coldspring, TX (US)

( * ) Notice: Subject to any disclaimer, the term of this patent is extended or adjusted under 35 U.S.C. 154(b) by 797 days.

(21) Appl. No.: 12/074,901

(22) Filed: Mar. 6, 2008

(51) Int. Cl.
*G06F 15/18* (2006.01)
(52) U.S. Cl. .......................................................... 706/12
(58) Field of Classification Search ........................ None
See application file for complete search history.

(56) References Cited

U.S. PATENT DOCUMENTS

| | | | |
|---|---|---|---|
| 5,335,291 A | | 8/1994 | Kramer |
| 5,754,681 A | * | 5/1998 | Watanabe et al. ............. 382/159 |
| 6,095,982 A | * | 8/2000 | Richards-Kortum et al. 600/476 |
| 6,418,409 B1 | | 7/2002 | Metzger |
| 6,732,083 B2 | | 5/2004 | Bax |

OTHER PUBLICATIONS

Guerrero-Curieses et al. "Supervised Classification of Remote Sensing Images with Unknown Classes", IEEE, 2000, pp. 3486-3488.*
Mantero et al. "Partially Supervised Classification of Remote Sensing Images Through SVM-Based Probability Density Estimation", IEEE GRS, vol. 43, No. 3, 2005, pp. 559-570 (cited in IDS).*
T. Cacoullos, "Estimation of a multivariate density," Ann. Inst. Statist. Math., vol. 18, pp. 179-189, 1966.
R. O. Duda and P. E. Hart, Pattern Classification and Scene Analysis, New York: John Wiley & Sons, 1973.
E. Fix, et al "Discriminatory analysis, nonparametric discrimination," USAF School of Aviation Medicine, Randolph Field, Tex Project 21-49-004, Rep. 4, 1951.
K. Fukunaga, et al, "Bayes Error Estimation Using Parzen and k-NN Procedures", IEEE Transactions on PAMI, vol. PAMI-9, No. 5, Sep. 1987, p. 634-643.
B. Gorte, et al, "Non-parametric classification algorithm with an unknown class", Proceedings of the International Symposium on Computer Vision, pp. 443-448, 1995.
A. Guerrero, et al., "Supervised Classification of Remote Sensing Images with Unknown Classes," Proceedings of IGARSS-2002 Conference, Toronto, Canada, Jun. 2002.
J. Grim, et al., "Initialing Normal Mixtures of Densities," Proceedings of the 14th International Conference on Pattern Recognition-vol. 1, p. 886, 1998.
I. L. Johnson, Jr., "The Davidon-Fletcher-Powell Penalty Function Method: A Generalized Iterative Technique for Solving parameter Optimization Problems", NASA TN D-8251,1976.
M. C. Jones and D. A. Henderson, "Maximum likelihood kernel density estimation," Technical Report May 2001, Depmt of Statistics., Open University, Jan. 2005.
P. Mantero, "Partially supervised classification of remote sensing images using SVM-based probability density estimation", IEEE Trans Geo/Remote Sens.vol. 43, No. 3, Mar. 2005.

(Continued)

*Primary Examiner* — Omar F Fernandez Rivas
*Assistant Examiner* — Li-Wu Chang

(57) ABSTRACT

A system and method for estimating the a priori probability of a class-of-interest in an input-data-set and a system and method for evaluating the performance of the adaptive Bayes classifier in classifying unlabeled samples from an input-put-data-set. The adaptive Bayes classifier provides a capability to classify data into two classes, a class-of-interest or a class-other, with minimum classification error in an environment where a priori knowledge, through training samples or otherwise, is only available for a single class, the class-of-interest. This invention provides a method and system for estimating the a priori probability of the class-of-interest in the data set to be classified and evaluating adaptive Bayes classifier performance in classifying data into two classes, a class-of-interest and a class-other, using only labeled training samples, or otherwise, from the class-of-interest and unlabeled samples from the data set to be classified.

27 Claims, 16 Drawing Sheets

OTHER PUBLICATIONS

T. C. Minter, "A Discriminant Procedure for Target Recognition in Imagery Data", Proceedings of the IEEE 1980 Nat. Aerospace and Electronic Conference—NAECON 1980, May 1980.

E. Parzen, "On estimation of a probability density function and mode," Ann. Math. Statist., vol. 33, pp. 1065-1076, 1962.

M. Rosenblatt, "Remarks on some nonparametric estimates of a density function," Ann. Math. Statist., vol. 27, pp. 832-837, 1956.

P. Whittle, "On the smoothing of probability density functions," J. Roy. Statist., Ser B, vol. 20, pp. 334-343, 1958.

C. K. Chow, "On Optimum Recognition Error and Reject Tradeoff", IEEE Trans. on info. Theory, vol. IT-16, No. 1, Jan. 1970, pp. 41-46.

K. Fukunaga, et. al., "Application of Optimum Error-Reject Functions," IEEE Trans. on Infomation Theory, Nov. 1972, pp. 814-817.

K. Fukunaga, et. al., "Estimation of Classifier Performance," IEEE Trans. on PAMI, vol. 11. No. 10, Oct. 1989, pp. 1087-1101.

K. Fukunaga, et. al., Nonparametric Bayes Error Estimation Using Unclassified Samples, IEEE Trans. on Infomation Theory, vol. IT-19, No. 4, Jul. 1973, pp. 434-440.

K. Fukunaga, et. al., "Leave-One-Out Procedures for Nonparametric Error Estimates," IEEE Trans. on PAMI, vol. II. No. 4, Apr. 1989, pp. 421-423.

A. K. Jain, "Biometrics: A Grand Challenge", Proceeding of the 17th International Conference on Pattern Recognition, (ICPR'04), 2004.

NIST Report to Congress, "Summary of NIST Standards for Biometric Accuracy, Tamper Resistance, and Interoperability.", Nov. 2002.

B. Eckstein, "Evaluating the Benefits of assisted Target Recognition", Proceeding of the 30th Applied Imagery Pattern recognition Workshop (AIPR'01), 2001.

S. Rizvi, "Fusion Techniques for Automatic Target Recognition", Proceedings of the 32nd Applied Imagery Pattern Recognition Workshop (AIPR'03), 2003.

B. Jeon and D. A. Landgrebe, "Partially Supervised Classification With Optimal Significance Testing," Geoscience and Remote Sensing Symposium, 1993, pp. 1370-1372.

A. K. Jain, et. al., "Statistical Pattern Recognition: A Review", IEEE Trans. on PAMI, vol. 22, No. 1, pp. 4-37, Jan. 2000.

* cited by examiner

Generating Statistics $$\mu_{C_{\text{int}}} = \begin{bmatrix} 0 \\ 0 \end{bmatrix}, \quad \Sigma_{C_{\text{int}}} = \begin{bmatrix} 1 & 0.5 \\ 0.5 & 1 \end{bmatrix}$$

$$\mu_{C_{\text{other}}} = \begin{bmatrix} 1 \\ 1 \end{bmatrix}, \quad \Sigma_{C_{\text{other}}} = \begin{bmatrix} 1 & -0.5 \\ -0.5 & 1 \end{bmatrix}$$

$$P_{C_{\text{int}}} = 0.4, \quad P_{C_{\text{unk}}} = 0.6$$

FIG.2B

Gaussian Maximum Likelihood Classification Results for Three Different Sets of Class Weights and the Estimate of the a priori Probability of the Class-of-Interest, $P_{Cint}$, Obtained from the Classification Results

| $W_{Cint}$ (20) | $W_{Cother}$ (22) | $PCC_{Cint}$ (24) | $PCC_{Cother}$ (26) | $PC_{Cint}$ (28) | $P_{Cint}$ (30) |
|---|---|---|---|---|---|
| 0.3 | 0.7 | 0.508 | 0.994 | 0.207 | 0.4 |
| 0.5 | 0.5 | 0.742 | 0.844 | 0.39 | 0.4 |
| 0.7 | 0.3 | 0.833 | 0.722 | 0.5 | 0.4 |

FIG.3A

Adaptive Bayes Classification Results for Three Different of Class-of-Interest Weights, $W_{Cint}$

| $W_{Cint}$ | $PCC_{Cint}$ | $PCC_{Cother}$ | $PC_{Cint}$ | $P_{Cint}$ |
|---|---|---|---|---|
| 0.3 | 0.506 | Unknown | 0.208 | ? |
| 0.5 | 0.741 | Unknown | 0.391 | ? |
| 0.7 | 0.831 | Unknown | 0.502 | ? |

FIG.3B

GENERATING STATISTICS $$\mu_{C_{int}} = \begin{bmatrix} 0 \\ 0 \end{bmatrix}, \qquad \Sigma_{C_{int}} = \begin{bmatrix} 1 & 0.5 \\ 0.5 & 1 \end{bmatrix}$$

$$\mu_{C_{other}} = \begin{bmatrix} d \\ 0 \end{bmatrix}, \quad d = 0,\ldots.6, \quad \Sigma_{C_{other}} = \begin{bmatrix} 1 & -0.5 \\ -0.5 & 1 \end{bmatrix}$$

$$P_{C_{int}} = 0.4, \qquad P_{C_{other}} = 0.6$$

FIG.8B

PRIORI PROBABILITY AND PROBABILITY OF ERROR ESTIMATION FOR ADAPTIVE BAYES PATTERN RECOGNITION

CROSS-REFERENCE TO RELATED APPLICATIONS

This application is related to application Ser. No. 12/004,329 filed on Dec. 20, 2007, entitled "Adaptive Bayes Pattern Recognition" and application Ser. No. 12/011,518 filed on Jan. 28, 2008, entitled "Adaptive Bayes Feature Extraction".

FEDERALLY SPONSORED RESEARCH

Not applicable

BACKGROUND OF THE INVENTION

1. Field of Invention

This invention generally relates to the issue of a priori probability estimation of a class-of-interest and the evaluation of the performance of the adaptive Bayes classifier. The adaptive Bayes classifier provides a capability to classify data into two classes, a class-of-interest or a class-other, with minimum classification error in an environment where a priori knowledge, through training samples or otherwise, is only available for a single class—the class-of-interest. This invention defines a method and system for estimating the a priori probability of the class-of-interest in an input-data-set and evaluating adaptive Bayes classifier performance in classifying data in input-data-set into, two classes, a class-of-interest and a class-other, using only training samples, or otherwise, from the class-of-interest and unlabeled samples from the data set to be classified.

2. Prior Art

There are many applications where prior knowledge, through training samples or otherwise, is only available for a single class; the classes-of-interest. The distribution of the class-other may be unknown, may have changed or may be inaccurate due to insufficient numbers of samples used to estimate the distribution of the other-class. In addition, the cost of obtaining labeling samples, for purposes of defining all the classes in a given dataset, by collecting ground truth or otherwise, may be very expensive or impossible to obtain. Often one is only interested in one class or a small number of classes.

The adaptive Bayesian classifier provides a capability for accurately classifying data in this restricted environment. The adaptive Bayesian classifier uses information from a set of labeled patterns, descriptive of the classes-of-interest, unlabeled patterns from the data set to be classified, and an estimate of the a priori probability of the class-of-interest, to estimate an optimal Bayesian discriminant boundary which can be used to classify a data set with minimum error. However, the performance of the adaptive Bayesian classifier is dependent on the accuracy of the a priori probability estimate provided for the class-of-interest. In addition, adaptive Bayesian classification accuracy cannot be readily evaluated when labeled samples are only available for one class, the class-of-interest.

A system and method is presented for estimating the a priori probability of the class-of-interest in the data set to be classified and for estimating adaptive Bayesian classification accuracy, using only labeled samples from the class-of-interest and unlabeled data from an input-data-set. An accurate estimate of the a priori probability of the class-of-interest in the data set to be classified can significantly improve classification accuracy of the adaptive Bayes classifier. In addition, an estimate of the performance of the adaptive Bayes classifier in classifying an input-data-set is highly desirable in providing confidence in the classification results. Normal techniques for evaluating classifier performance are not applicable in an environment where labeled sample are available for only one class, the class-of-interest.

The rest of this section is organized as follows. First, the theory of the Bayes decision rule is reviewed for the two class case. The adaptive Bayes decision rule is then presented. Two methods are presented for implementing the adaptive Bayes decision rule. Finally, prior approaches to a priori probability estimation and classifier performance assessment are described.

The Adaptive Bayes Approach to Pattern Recognition

Bayes decision theory is a fundamental approach to the problem of pattern recognition. The approach is based on the assumption that the decision problem can be poised in probabilistic terms where all of the relevant probability values are known. Specifically, the application of a standard Bayesian statistical supervised classifier usually requires estimating class posterior probability functions for each class recognition [R. O. Duda and P. E. Hart, *Pattern Classification and Scene Analysis*, New York: John Wiley & Sons, 1973, pp. 11-17]. If information about the probability distributions of classes is available, the posterior probability is calculated for every measurement and each measurement is attributed to the class with the maximum posterior probability.

The decision making process for using Bayes pattern recognition for classifying data into two known classes, a class-of-interest and a class-other, can be summarized as follows: Given a set of measurement vectors, it desired is to associate the measurements with either the classes-of-interest or class-other with minimum probability error. The set of measurements, X, can conveniently be represented as a vector in the measurement space. This vector will be called the measurement vector or simply a sample or a pattern and will be denoted as $X=(x_1, x_2, \ldots x_d)^T$ where d is the number of measurements or the dimensionality of the measurement space.

Let us defined the density functions of the two classes as follows; the class-of-interest is $P(X/C_{int})$ and class-other is $P(X/C_{other})$. Each class has associated a priori probabilities of $P_{C_{int}}$ and $P_{C_{other}}$ respectively.

The standard maximum likelihood decision rule for this two class pattern recognition problem is:

$$\text{If: } P_{C_{int}} P(X/C_{int}) \geq P_{C_{other}} P(X/C_{other}), \qquad (1)$$

Classify X as the class-of-interest
Otherwise, classify X as the class-other
where
$P(X/C_{int})$=Conditional probability density function of the class-of-interest
$P(X/C_{other})$=Conditional probability density function of class-other
$P_{C_{int}}$=a priori probability of the class-of-interest
$P_{C_{other}}$=a priori probability of class-other An equivalent decision rule, to eq. (1), can be obtained by dividing both sides of eq. (1) by the unconditional probability of X, P(X) or:

$$\text{If: } \frac{P_{C_{int}} P(X/C_{int})}{P(X)} \geq \frac{P_{C_{other}} P(X/C_{other})}{P(X)}; \qquad (2)$$

Classify X as the class-of-interest
Otherwise, classify X as the class-other
where $$P(X) = P_{C_{int}} P(X/C_{int}) + P_{C_{other}} P(X/C_{other}) \qquad (3)$$

Equation (2) is the Bayes decision rule. It can also be defined in terms of posterior probabilities as:

$$\text{If:} P(C_{int}/X) \geq P(C_{other}/X), \quad (4)$$

Classify X as the class-of-interest
Otherwise, classify X as the class-other
where $P(C_{int}/X)$ and $P(C_{other}/X)$ are the posterior probability functions for the class-of-interest and class-other. The posterior probability functions are defined as:

$$P(C_{int}/X) = \frac{P_{C_{int}} P(X/C_{int})}{P(X)} \quad (5)$$

$$P(C_{other}/X) = \frac{P_{C_{other}} P(X/C_{other})}{P(X)} \quad (6)$$

Minter [T. C. Minter, "A Discriminant Procedure for Target Recognition in Imagery Data", Proceedings of the IEEE 1980 National Aerospace and Electronic Conference—NAECON 1980, May 20-22, 1980] proposed an alternative to the Bayes decision rule. He noted that the posterior probability functions sum to 1, namely $$P(C_{int}/X) + P(C_{other}/X) = 1 \quad (7)$$

Rearranging equation (7) we get $$P(C_{other}/X) = 1 - P(C_{int}/X) \quad (8)$$

Substituting equation (8) into (4) and simplifying we get an alternative Bayes decision function which only involves the class-of-interest posterior probability function, $P(C_{int}/X)$, namely $$\text{If:} P(C_{int}/X) \geq \frac{1}{2}, \quad (9)$$

Classify X as the class-of-interest
Otherwise, classify X as class-other
where $$P(C_{int}/X) = \frac{P_{C_{int}} P(X/C_{int})}{P(X)} \quad (10)$$

Equation (9) is the adaptive Bayes decision rule or alternatively, the adaptive Bayes classifier. This formulation of the Bayes decision rule is particularly useful since it only requires a priori knowledge of the of the conditional density function for the class-of-interest, $P(X/C_{int})$, the a priori probability for the class-of-interest, $P_{C_{int}}$, and an estimate of the unconditional probability function, $P(X)$. $P(X)$ can be estimated using any of a number of nonparametric density function techniques using only unlabeled samples from the data set of to be classified. However, an alternative least squares estimator is presented below for directly estimating of the class-of-interest posterior probability function, $P(C_{int}/X)$, using only labeled sample from the class-of-interest and unlabeled samples from the data set to be classified.

In addition, it will be shown below that classification results provide a significant amount of information about a priori probabilities. It will be shown that the a priori probability of the class-of-interest and the performance of the adaptive Bayes classifier can be estimated using classification results obtained by applying the adaptive Bayes classifier to a data set.

Procedures for Estimation of the Adaptive Bayes Decision Rule

First we will review two approaches for estimating the class-of-interest posterior probability function, $P(C_{int}/X)$, used by the adaptive Bayes decision rule, eq. (9). The first approach uses nonparametric density function techniques. The second approach approximates the class-of-interest posterior probability function $P(C_{int}/X)$ in eq. (9) using a least squares estimation procedure.

Approximating the Class-of-Interest Posterior Probability Function Using Nonparametric Density Estimation Techniques Density functions $P(X/C_{int})$ and $P(X)$, eq. (10), can be estimated using any of several non-parametric density techniques such as histogramming, Parzen kernel density estimation, and $K^{th}$ nearest neighbor estimation [R. O. Duda and P. E. Hart, *Pattern Classification and Scene Analysis*, New York: John Wiley & Sons, 1973, pp. 95-98].

Gorte [B. Gorte and N. Gorte-Kroupnova, "Non-parametric classification algorithm with an unknown class", *Proceedings of the International Symposium on Computer Vision*, 1995, pp. 443-448], Mantero [P. Mantero, "Partially supervised classification of remote sensing images using SVM-based probability density estimation", IEEE Transactions on Geoscience and Remote Sensing, vol. 43, no. 3, March 2005, pp. 559-570], and Guerrero-Curieses [A. Guerrero-Curieses, A Biasiotto, S. B. Serpico, and G. Moser, "Supervised Classification of Remote Sensing Images with Unknown Classes," Proceedings of IGARSS-2002 Conference, Toronto, Canada, June 2002] investigated the use of the $K^{th}$ nearest neighbor probability estimation in approximating the class-of-interest posterior probability function, $P(C_{int}/X)$. They demonstrated its use in classifying remotely sensed data using the adaptive Bayes decision rule, eq. (9).

$K^{th}$ nearest neighbor density function estimation has two disadvantages. The first disadvantage is that the accuracy of a $K^{th}$ nearest neighbor in estimating the class-of-interest posterior probability function $P(C_{int}/X)$ is very dependent on the value selected for K. Fukunaga [K. Fukunaga, D. M. Hummels, "Bayes Error Estimation Using Parzen and k-NN Procedures", IEEE Transactions on Pattern Analysis and Machine Intelligence, Vol. PAMI-9, Number 5, September 1987, p. 634-643] concluded there is no optimal method for selecting a value for K. The approach often used is to evaluate the classification accuracy obtained using various values of K and select the value of K that maximizes classification accuracy. However, this approach requires that labeled samples be available from all the classes for use in evaluating classification accuracy. The second disadvantage is that $K^{th}$ nearest neighbor is computationally slow as a result of the need to repeatedly compute the distance, from the measurement vector to be classified, to the other measurements vectors in the data set.

Least Squares Estimation of the Adaptive Bayes Decision Function

Below, a least squares criteria is presented that can be used to approximate the class-of-interest posterior probability function, $P(C_{int}/X)$, used by the adaptive Bayes decision rule, eq. (9). Two methods are presented for using this least squares criterion to approximate the class-of-interest posterior probability function, $P(C_{int}/X)$. The first method approximates the class-of-interest posterior probability function using a polynomial. The second method approximates the class-of-interest posterior probability function using Parzen kernels.

Minter [T. C. Minter, "A Discriminant Procedure for Target Recognition in Imagery Data", Proceedings of the IEEE 1980 National Aerospace and Electronic Conference—NAECON 1980, May 20-22, 1980], proposed a least squares criterion for estimating the class-of-interest posterior probability function, $P(C_{int}/X)$, eq. (10). The class-of-interest posterior probability function can be approximated by minimizing the mean square difference between the estimated posterior probability function and the true posterior probability function for the class-of-interest. This is accomplished using the following least squares criterion:

$$J=\int(\hat{P}(C_{int}/X)-P(C_{int}/X))^2 P(X)dX+K \quad (11)$$

where $$P(C_{int}/X) = \frac{P_{C_{int}}P(X/C_{int})}{P(X)} \quad (12)$$

In eq. (11), $\hat{P}(C_{int}/X)$ is the estimated class-of-interest posterior probability function, $P(C_{int}/X)$ is the true (but unknown) class-of-interest posterior probability function, and K is an arbitrary constant. However, the least squares criteria, eq. (11), cannot be minimized directly since the true class-of-interest posterior probability function, $P(C_{int}/X)$, is unknown.

The least square criterion is reformulated below to provide an equivalent criterion that can be minimized and used to estimate the class-of-interest posterior probability function $\hat{P}(C_{int}/X)$.

First, expanding the least squares criteria, eq. (11), we get $$J=\int(\hat{P}(C_{int}/X)^2-2\hat{P}(C_{int}/X)P(C_{int}/X)+P(C_{int}/X)^2)P(X)dX+K \quad (13)$$

$$J=\int\hat{P}(C_{int}/X)^2 P(X)dX-\int 2\hat{P}(C_{int}/X)P(C_{int}/X)P(X)dX+\int P(C_{int}/X)^2 P(X)dX+K \quad (14)$$

$$J = \int\left(\hat{P}(C_{int}/X)^2 P(X)dX - \int 2\hat{P}(C_{int}/X)\frac{P_{C_{int}}P(X/C_{int})}{P(X)}P(X)dX + \int P(C_{int}/X)^2 P(X)dX + K\right) \quad (15)$$

$$J=\int\hat{P}(C_{int}/X)^2 P(X)dX-\int 2\hat{P}(C_{int}/X)P_{C_{int}}P(X/C_{int})P(X)dX+\int P(C_{int}/X)^2 P(X)dX+K \quad (16)$$

Now let $$K'=2P_{C_{int}}=2P_{C_{int}}\int P(X/C_{int})dX \quad (17)$$

and we get:

$$J=\int\hat{P}(C_{int}/X)^2 P(X)dX-2P_{C_{int}}\int[\hat{P}(C_{int}/X)-1]P(X/C_{int})dX+K' \quad (18)$$

Next we define the expected value with respect to the labeled samples from the class-of-interest as:

$$E_{C_{int}}(\circ)=\int(\circ)P(X/C_{int})dX \quad (19)$$

The expected value with respect to the unlabeled samples from P(X) (the data to be classified) is defined as:

$$E(\circ)=\int(\circ)P(X)dX \quad (20)$$

Using these definitions, the least square criteria, eq. (18), can be rewritten as:

$$J=E[\hat{P}(C_{int}/X)^2]+2P_{C_{int}}E_{C_{int}}[\hat{P}(C_{int}/X)-1]+K' \quad (21)$$

We will approximate the class-of-interest posterior probability function, $\hat{P}(C_{int}/X)$, using a linear combination of functions-of-the-measurements.

Let $$\hat{P}(C_{int}/X)\cong A^T F(X) \quad (22)$$

where F(X) is as vector containing functions-of-the-measurements, $f(X)_i$ i=1,n or $$F(X)=(f(X)_1, f(X)_2, \ldots f(X)_n)^T \quad (23)$$

where n is the number of functions-of-the-measurements used to approximate $\hat{P}(C_{int}/X)$. and A is a vector of weights for the f(X)'s $$A=(a_1, a_2, \ldots a_n)^T \quad (24)$$

Substituting eq. (22) into eq. (21) we get:

$$J=E[(A^T F(X))^2]+2P_{C_{int}}E_{C_{int}}[A^T F(X)-1]+K' \quad (25)$$

This formulation of the least square error criteria, eq. (25), is equivalent to the original least squares criterion, eq. (11), however, eq. (25) can be evaluated since there are no unknowns. In addition, eq. (25) can be evaluated using only labeled samples from the class-of-interest and unlabeled samples from the data set to be classified.

An estimate of the parameters of the weighting vector A, eq. (24), is obtained by minimization of the least-square criterion, defined in eq. (25), with-respect-to the vector A.

Differentiating J in eq. (25) with-respect-to A and setting to zero we get:

$$\frac{\delta J}{\delta A} = 2E[(F(X)F(X)^T A)] + 2P_{C_{int}}E_{C_{int}}[F(X)] = 0 \quad (26)$$

Rearranging yields $$E[(F(X)F(X)^T)]A=P_{C_{int}}E_{C_{int}}[F(X)] \quad (27)$$

and finally we get $$A=P_{C_{int}}E[(F(X)F(X)^T)]^{-1}\cdot E_{C_{int}}[F(X)] \quad (28)$$

Given a set of N unlabeled samples $(X_1, X_2, \ldots X_N)$ from the data set to be classified and M labeled samples from the class-of-interest, $X_1(C_{int}), X_2(C_{int}), \ldots X_M(C_{int}))$, the weighting vector A may be estimated as follows:

$$A = P_{C_{int}}\frac{1}{N}\sum_{i=1}^{N}[(F(X_i)F(X_i)^T)]^{-1}\cdot\frac{1}{M}\sum_{j=1}^{M}[F(X_j(C_{int}))] \quad (29)$$

Using the parameter vector A, estimated in eq. (29), the adaptive Bayes decision rule, eq. (9), can now be written as $$\text{If:} A^T F(X) \geq \frac{1}{2}, \quad (30)$$

Classify X as the class-of-interest

Otherwise, classify X as class-other where eq. (22) has been substituted for $\hat{P}(C_{int}/X)$, in eq. (9).

Least Squares Approximation of the Class-of-Interest Posterior Probability Function Using a Polynomial Minter [T. C. Minter, "A Discriminant Procedure for Target Recognition in Imagery Data", Proceedings of the IEEE 1980 National Aerospace and Electronic Conference—NAECON 1980, May 20-22, 1980] proposed using a nonparametric multi-dimensional polynomial to approximate the class-of-interest posterior probability function, $\hat{P}(C_{int}/X)$. The class-of-interest posterior probability function, $P(C_{int}/X)$, can be approximated with a polynomial of any order—first, second, third, etc. However, the order of the polynomial used to fit the class-of-interest posterior probability function also determines the order of the decision boundary used to separate the two classes, the class-of-interest and class-other.

For example, for a two dimension measurement vector, we can approximate the class-of-interest posterior probability function using a second order polynomial function, of the form:

$$\hat{P}(C_{int}/X) \approx a_0 + a_1 x_1 + a_2 x_2 + a_3 x_1 x_2 + a_4 x_1^2 + a_5 x_2^2 \quad (31)$$

or using vector notation $$\hat{P}(C_{int}/X) \approx A^T F(X) \quad (32)$$

where $$A = (a_0, a_1, a_2, a_3, a_4, a_5)^T \quad (33)$$

and $$F(X) = (1, x_1, x_2, x_1 x_2, x_1^2, x_2^2) \quad (34)$$

Use of the second order function in eq. (30) implies the decision boundary will be a quadratic function. If the distributions of the two class probability density functions are Gaussian with unequal covariances, a quadratic decision boundary is optimal [R. O. Duda and P. E. Hart, *Pattern Classification and Scene Analysis*, New York: John Wiley & Sons, 1973, pp. 30]. If the expected decision boundary is highly complex, an even higher order polynomial may be required.

Approximating the Class-of-Interest Posterior Probability Function with Parzen Kernels Densities The kernel method of estimating density functions is a well-known and much studied technique for nonparametric density estimation [R. O. Duda and P. E. Hart, *Pattern Classification and Scene Analysis*, New York: John Wiley & Sons, 1973, pp. 88-95]. The need for nonparametric techniques stems from a wide range of applications in which the experimenter is unwilling to assume a parametric family for the true underlying probability density function. The basic foundation for nonparametric density estimation was Fix and Hodges' [E. Fix and J. L. Hodges, "Discriminatory analysis, nonparametric discrimination," U.S. Air Force School of Aviation Medicine, Randolph Field, Tex. Project 21-49-004, Rep. 4, Contract AF-41-(128)-31, February 1951] original work. They based their results on the concept that the value of a density function at a point can be estimated using the number of sample observations that fall within a small region around that point.

Rosenblatt [M. Rosenblatt, "Remarks on some nonparametric estimates of a density function," *Ann. Math. Statist.*, vol 27, pp. 832-837, 1956], Whittle [P. Whittle, "On the smoothing of probability density functions," *J. Roy. Statist.*, Ser B, vol. 20, pp. 334-343, 1958], Parzen [E. Parzen, "On estimation of a probability density function and mode," *Ann. Math. Statist.*, vol. 33, pp. 1065-1076, 1962.], and Cacoullos [T. Cacoullos, "Estimation of a multivariate density," *Ann. Inst. Statist. Math.*, vol. 18, pp. 179-189, 1966] generalized these results and developed the Parzen kernel class of estimators. Conditions on the kernel function were derived to ensure asymptotically unbiased, consistent and uniformly consistent estimators.

Given R samples, $S = \{X_1, \ldots X_R\}$ drawn from a population with density function $P(X)$, the Parzen density estimate $\hat{P}(X)$ of the unknown probability function at each sample $X_i$ is defined as $$P(X) = \frac{1}{R} \sum_{i=1}^{R} \frac{1}{h} K\left(\frac{X - X_i}{h}\right) \quad (35)$$

where $K(\cdot)$ is a window or kernel function and h is the window width, smoothing parameter, or simply the kernel size. Normally, the smoothing parameter h is single value. The samples in the set $S = \{X_1, \ldots X_R\}$ are used as the function kernels for $K_i$.

Often it is convenient to assume a d-dimension Gaussian form for kernels, or $$\hat{P}(X/k_i) = \frac{1}{2\pi^{d/2}|H|^{1/2}} e^{-1/2(X-X_i)^T H^{-1}(X-X_i)} \quad (36)$$

where H is the kernel smoothing parameter. H is defined as $$H = \begin{bmatrix} h_{11}^2 & \cdots & h_{1d}^2 \\ \vdots & \ddots & \vdots \\ h_{d1}^2 & \cdots & h_{dd}^2 \end{bmatrix} \quad (37)$$

This expanded form of H, eq. (36), is useful since if accounts for both measurement scaling and correlation between the measurements. A procedure for estimating H will be defined later.

The multi-dimensional Parzen density estimate at X is defined as $$\hat{P}(X) = \frac{1}{R} \sum_{i=1}^{R} \hat{P}(X/k_i) \quad (38)$$

where $\hat{P}(X/k_i)$ is the Gaussian kernel defined in eq. (36), R is the number of kernels.

A modified Parzen kernel estimator will be used to approximate the class-of-interest posterior probability function, $P(C_{int}/X)$. In particular, the class-of-interest posterior probability function $\hat{P}(C_{int}/X)$ will be approximated using $A^T F(X)$, eq. (22), as follows:

The vector $F(X)$ is defined as $$F(X) = (f(X)_1, f(X)_2, \ldots f(X)_R)^T \quad (39)$$

The function-of-features, $f(X)_i$ $i=1,R$ in eq. (39) are defined as $$f(X)_i = \frac{P(X/k_i)}{P(X)} \quad (40)$$

and finally, substituting (40) into eq. (39), the vector $F(X)$ is defined as $$F(X) = \left[\frac{P(X/k_1)}{P(X)}, \frac{P(X/k_2)}{P(X)}, \ldots \frac{P(X/k_R)}{P(X)}\right]^T \quad (41)$$

The parameters of the weighting vector, A, are defined as $$A = (a_1, a_2, \ldots a_R)^T \quad (42)$$

Taking the product of $A^T F(X)$, we get $$A^T F(X) = a_1 \frac{P(X/k_1)}{P(X)} + a_2 \frac{P(X/k_2)}{P(X)} \ldots + a_R \frac{P(X/k_R)}{P(X)} \quad (43)$$

or $$A^T F(X) = \sum_{i=1}^{R} a_i \frac{P(X/k_i)}{P(X)} \qquad (44)$$

Thus, $A^T F(X)$ is seen to be weighted linear combination of posterior probability functions estimated using Parzen kernels. The weighting vector A is estimated using the least squares estimator, eq. (29).

Estimating the Smoothing Parameter H for the Parzen Kernels

A number of authors have studied the problem of determining a value for the Parzen smoothing parameter h. Fukunaga [K. Fukunaga, D. M. Hummels, "Bayes Error Estimation Using Parzen and k-NN Procedures", IEEE Transactions on Pattern Analysis and Machine Intelligence, Vol. PAMI-9, Number 5, September 1987, p. 634-643] proposed a least squares approach for estimating the smoothing parameter h. However, Fukunaga's least square estimator of h is not directly related to the set of kernels selected and was shown to provide inconsistent results.

Jones [M. C. Jones and D. A. Henderson, "Maximum likelihood kernel density estimation," Technical Report May 2001, Department of Statistics, Open University] and Grim [J. Grim, J. Novovicova, P. Pudil, and P. Somol, "Initialing Normal Mixtures of Densities," Proceedings of the 14th International Conference on Pattern Recognition-Volume 1, p. 886, 1998] suggested an approach for estimating the kernel smoothing parameter H using maximum likelihood estimation. They used the well known log-likelihood criterion for finite mixtures [R. O. Duda and P. E. Hart, Pattern Classification and Scene Analysis, New York: John Wiley & Sons, 1973, pp. 189-201] to estimate an optimal smoothing parameter for the unknown density. In particular, a smoothing parameter, $H_i$, is estimated for each kernel density, $k_i$ i=1 . . . R, using an iterative equation. An optimal smoothing parameter, H, was obtained for the unknown density function by computing a weighted average of the individual kernels $H_i$. This procedure provides good results but is computationally intensive.

An alternative maximum likelihood kernel density estimation technique is presented below which provides a maximum likelihood estimate of the kernel smoothing parameter for the unknown density function. An iterative technique is proposed which estimates a value for H which is common all kernels.

One interpretation of the kernel density estimator is that it is a special case of the mixture density model of the form $$P(X) = \sum_{i=1}^{R} P_{k_i} P(X/k_i) \qquad (45)$$

where $$\hat{P}(X/k_i) = \frac{1}{2\pi^{d/2}|H|^{1/2}} e^{-1/2(X-X_i)^T H^{-1}(X-X_i)} \qquad (46)$$

where the data points from the set $S=\{X_1, \ldots X_R\}$ replace the Gaussian means in eq. (46), $P_{k_i}$ the a priori probability of the $i^{th}$ kernel, and all the kernels share a common smoothing matrix H.

We will let the a priori probability of the kernels be $$P_{k_i} = \frac{1}{R} \qquad (47)$$

where R is the number of kernels.

Now, suppose we are given a set $\Psi=\{X_1, X_2, \ldots X_N\}$ of N unlabeled samples drawn independently from the mixture density, then $$P(X \mid H) = \sum_{i=1}^{R} P_{k_i} P(X/k_i, H) \qquad (48)$$

where the smoothing parameter H is fixed but unknown.

The likelihood of the observed samples is by definition the joint probability $$P(\Psi \mid H) = \prod_{j=1}^{N} P(X_j / H) \qquad (49)$$

The maximum likelihood estimate of H is that value of $\hat{H}$ that maximizes $P(\Psi|H)$.

Let L be the logarithm of the likelihood of eq. (49), then $$L = \sum_{j=1}^{N} \log P(X_j / H) \qquad (50)$$

Differentiating L, eq. (50), with respect to H and setting the resulting expression to zero, we get $$\frac{\partial L}{\partial H} = \sum_{j=1}^{N} \sum_{i=1}^{R} \frac{P_{k_i} \cdot P(X_j/k_i, H)}{P(X_j/H)} \left[ -\frac{1}{2} \cdot H^{-1} + \frac{1}{2} H^{-1}(X_j - X_i)(X_j - X_i)^T H^{-1} \right] = 0 \qquad (51)$$

Solving eq. (51) for H, we obtain the following maximum likelihood estimator for H $$\hat{H} = \sum_{j=1}^{N} \sum_{i=1}^{R} \frac{P_{k_i} \cdot P(X_j/k_i)}{P(X_j)} \cdot \left[ \frac{1}{2}(X_j - X_i)(X_j - X_i)^T \right] \qquad (52)$$

This equation is an iterative maximum likelihood estimator for the smoothing parameter, H. Given an initial value for $H_0$, an updated value is obtained for H. The log likelihood function, eq. (50), is evaluated after each update to H. This process is repeated until there is no further change in the log likelihood function, eq. (50).

A Priori Probability Estimation

When labeled training samples are available for use in estimating the statistics for all the classes in a data set, maximum likelihood estimation, using a mixture of densities [R. O. Duda and P. E. Hart, *Pattern Classification and Scene Analysis*, New York: John Wiley & Sons, 1973, pp. 190-203], can be used to obtain an unbiased estimate of class a priori probabilities in an input data set.

When labeled training samples are available only for a single class, the class-of-interest, the simplest technique for estimating the class-of-interest a priori probability is to classify the input data set into two classes, the class-of-interest and class-other, by thresholding based on a measure of similarity of a measurement to the class-of-interest [B. Jeon and D. A. Landgrebe, "Partially Supervised Classification With Optimal Significance Testing," Geoscience and Remote Sensing Symposium, 1993, pp. 1370-1372]. If the similarity measure (a statistical probability) is lower than some threshold, the sample is assumed to belong to an unknown class; otherwise, it is assigned to the class-of-interest. The percent of input samples classified as class-of-interest is an estimate of the class-of-interest a priori probability. However, this procedure only works well when the density functions of the class-of-interest and the unknown class-other are well separated with no probability density function overlap.

Gorte [B. Gorte and N. Gorte-Kroupnova, "Non-parametric classification algorithm with an unknown class", *Proceedings of the International Symposium on Computer Vision*, 1995, pp. 443-448], Mantero [P. Mantero, "Partially supervised classification of remote sensing images using SVM-based probability density estimation", IEEE Transactions on Geoscience and Remote Sensing, vol. 43, no. 3, March 2005, pp. 559-570], and Guerrero-Curieses [A. Guerrero-Curieses, A Biasiotto, S. B. Serpico, and G. Moser, "Supervised Classification of Remote Sensing Images with Unknown Classes," Proceedings of IGARSS-2002 Conference, Toronto, Canada, June 2002] studied the problem of estimating the a priori probability of the class-of-interest for the adaptive Bayes classifier, eq. (9), where labeled samples are only available for the class-of-interest. However, their approach to a priori probability estimation requires the class-of-interest and the class-other to be well separated, with no probability density function overlap. Any overlap in the density functions of the class-of-interest and the class-other, results in a bias in the a priori probability estimate.

Classifier Performance Estimation

The literature on classifier performance estimation mostly addresses the problem of obtaining an unbiased estimate of classifier performance when labeled training and test samples are available from all the classes [A. K. Jain, R. W. Duin, and J. Mao, "Statistical Pattern Recognition: A Review", *IEEE Transactions on Pattern Analysis and Machine Intelligence*, vol. 22, no. 1, pp. 4-37, January 2000].

SUMMARY

A system and method for estimating the a priori probability of a class-of-interest in an input-data-set and a system and method for evaluating the performance of the adaptive Bayes classifier in classifying unlabeled samples from an input-put-data-set. The adaptive Bayes classifier provides a capability to classify data into two classes, a class-of-interest or a class-other, with minimum classification error in an environment where a priori knowledge, through training samples or otherwise, is only available for a single class, the class-of-interest. This invention provides a method and system for estimating the a priori probability of the class-of-interest in the data set to be classified using only labeled training samples, or otherwise, from the class-of-interest and unlabeled samples from the data set to be classified. This invention also provides a system and method for evaluating adaptive Bayes classifier performance in classifying data into two classes, a class-of-interest and a class-other, using only labeled training samples, or otherwise, from the class-of-interest and unlabeled samples from the data set to be classified.

Adaptive Bayes classification is useful in applications where class definitions, through training samples or otherwise, are provided a priori only for the classes-of-interest. The distribution of the other-class may be 1) unknown, 2) may have changed, 3) may be inaccurate due to insufficient numbers of samples used to estimate the distribution of the other-class or 4) the cost of obtaining labeling samples, for purposes of defining all the classes in a given data set, by collecting ground truth or otherwise, may be very expensive or impossible to obtain. Often one is only interested in one class or a small number of classes.

An accurate estimate of the a priori probability of the class-of-interest in the data set to be classified, can significantly improve the classification accuracy of the adaptive Bayes classifier. An estimate of the accuracy of the adaptive Bayes classifier in classifying an input-data-set is important in establishing confidences in the classification results.

In a first embodiment of the system and method, class-of-interest a priori probability and adaptive Bayes classifier performance is estimated using a least squares approximation of the class-of-interest posterior probability function using a polynomial.

In a second embodiment of the system and method, class-of-interest a priori probability and adaptive Bayes classifier performance is estimated using a least squares approximation of the class-of-interest posterior probability function using Parzen kernels.

BRIEF DESCRIPTION OF DRAWINGS

FIGS. 2A and 2B—where FIG. 2A shows plots of simulated data from two bi-variant Gaussian density functions, a class-of-interest and a class-other and two-sigma error ellipses for the two density functions. FIG. 2B shows the generating statistics for the two probability density functions.

FIGS. 3A and 3B—where FIG. 3A shows Gaussian maximum likelihood classification results for three different sets of class weights and the estimated a priori probability of the class-of-interest, $P_{C_{int}}$, obtained from the classification results. FIG. 3B shows adaptive Bayes classification results for three different class-of-interest weights on the same data set.

FIGS. 8A and 8B,—where FIG. 8A shows a plot of the simulated data used to evaluate the performance of the A Priori Probability and Probability of Error Estimation system. FIG. 8B shows the generating statistics for the two probability density functions.

FIG. 9A shows a plot of test results obtained from estimating the class-of-interest a priori probability versus distance between the means using the first embodiment the A Priori Probability and Probability of Error Estimation system. FIG. 9B shows the a plot of the estimated probability of error for the adaptive Bayes classifier versus distance between means—again estimated using the first embodiment the A Priori Probability and Probability of Error Estimation system.

FIG. 10A shows a plot of test results obtained from estimating the class-of-interest a priori probability versus distance between the means using the second embodiment the A Priori Probability and Probability of Error Estimation system. FIG. 10B shows the a plot of the estimated probability of error for the adaptive Bayes classifier versus distance between means—again estimated using the second embodiment the A Priori Probability and Probability of Error Estimation system.

DRAWINGS

Figure 1:
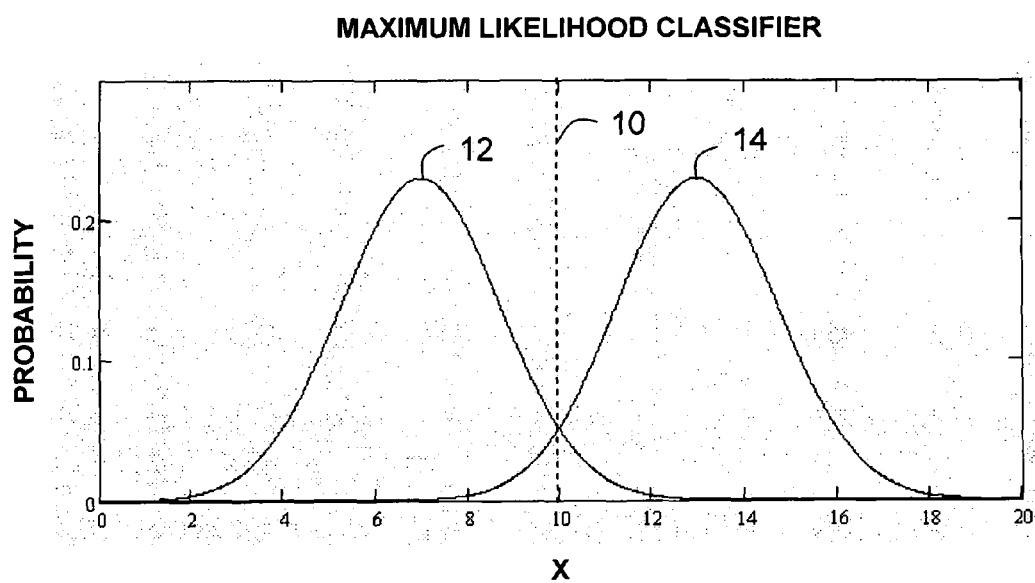
FIG. 1 is a plot illustrating Gaussian maximum likelihood classification of measurements into two classes, the class-of-interest and class-other.

Reference Numerals 10 decision boundary
12 plot of class-of-interest probability density function
14 plot of class-other probability density function
16 class-of-interest two sigma error ellipse and simulated data
18 class-other two sigma error ellipse and simulated data
20 weights for class-of-interest
22 weights for class-other
24 estimated probability of correct classification for the class-of-interest
26 estimated probability of correct classification for the class-other
28 estimated probability a samples is classified as class-of-interest
30 estimated a priori probability for the class-of-interest
32 weights for class-of-interest
34 estimated probability of correct classification for the class-of-interest
36 estimated probability of correct classification for the class-other
38 estimated probability a samples is classified as class-of-interest
40 estimated a priori probability for the class-of-interest
42 flow diagram for the A Priori Probability and Probability of Error Estimation system
44 adaptive Bayes classifier training module
46 memory
48 user interface
50 processing unit
52 a priori probability and adaptive Bayes classifier performance estimation module
54 output device
56 select polynomial elements
58 calculate weighting parameters for polynomial elements
60 select samples from input-data-set to serve as mean vectors of kernels
62 kernel smoothing parameter calculator
64 calculator for kernel weighting parameters
66 classify input-data-set three times using three different weight for the class-of-interest
68 search for three class-other probabilities of correct classification that minimize least square criteria
70 calculate a priori probability for class-of-interest
72 classify input-data-set using estimated a priori probability for class-of-interest,
74 calculate class-other probability of correct classification
76 calculate probability of error for adaptive Bayes classifier
78 class-of-interest two sigma error ellipse and simulated data
80 class-other two sigma error ellipse and simulated data
82 plot of estimated class-of-interest a priori probability versus distance between means using polynomial approximation of $P(C_{int}/X)$
84 plot of true class-of-interest a priori probability versus distance between means
86 plot of estimated probability of error for adaptive Bayes classifier versus distance between means using polynomial approximation of $P(C_{int}/X)$
88 plot of true probability of error for the adaptive Bayes classifier versus distance using the Gaussian maximum likelihood classifier results as the true probability of error
90 plot of estimated class-of-interest a priori probability versus distance between means using Parzen kernel approximation of $P(C_{int}/X)$
92 plot of true class-of-interest a priori probability versus distance between means
94 plot of estimated probability of error for adaptive Bayes classifier versus distance between means using Parzen approximation of $P(C_{int}/X)$
96 plot of true probability of error for the adaptive Bayes classifier versus distance using the Gaussian maximum likelihood classifier results as the true probability of error

DETAILED DESCRIPTION

FIGS. 1, 2, 3 and 4

Figure 4:
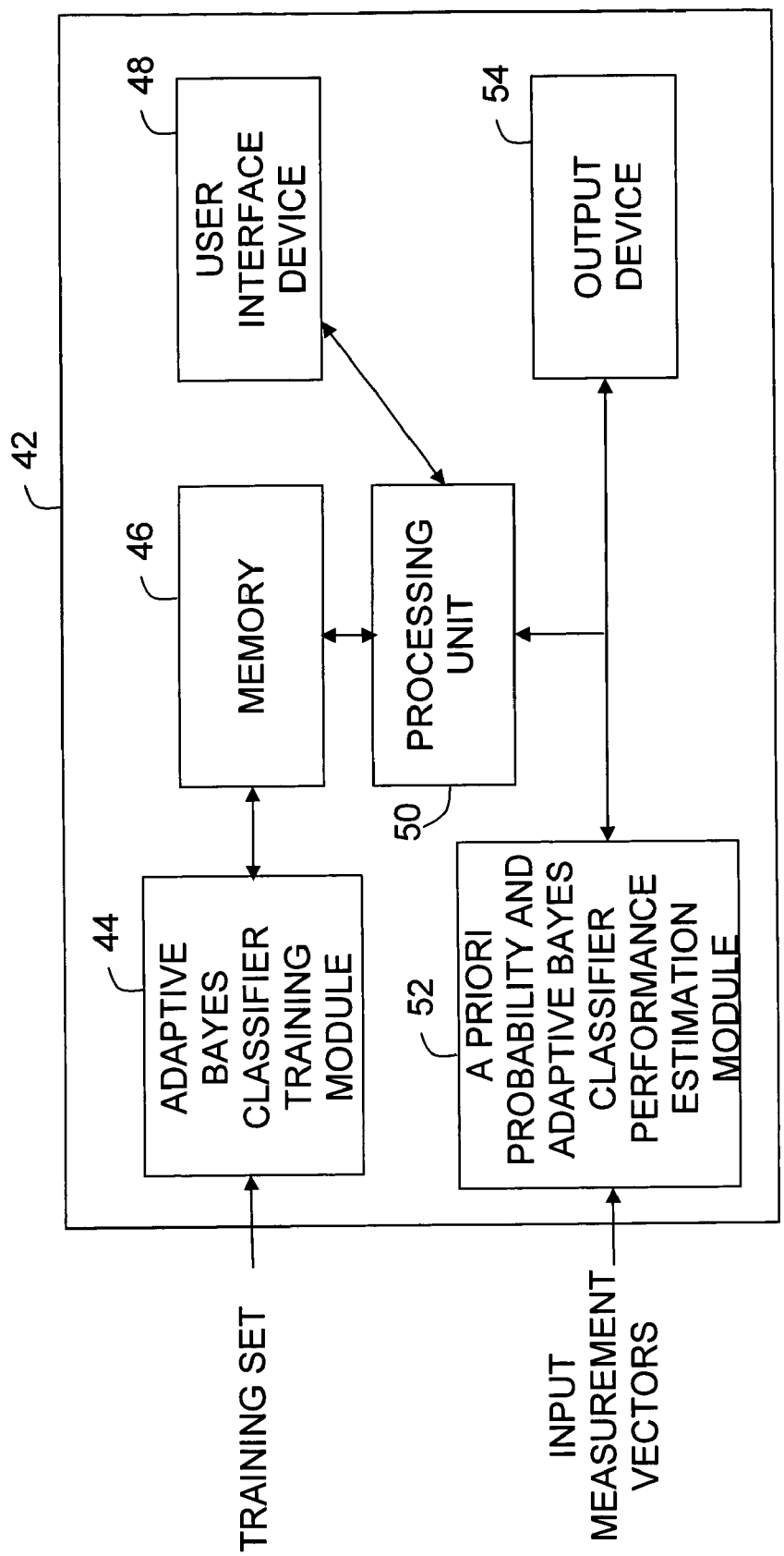
FIG. 4 shows a processing flow diagram for the A Priori Probability and Probability of Error Estimation system.

Referencing FIG. 4, an A Priori Probability and Probability of Error Estimation system 42 having an adaptive Bayes classifier training module 44, memory 46, a user interface device 48, a processing unit 50, an a priori probability and adaptive Bayes classifier performance estimation module 52, and an output device 54 is shown.

The A Priori Probability and Probability of Error Estimation system operates to estimate the a priori probability of the class-of-interest in the data set to be classified and evaluates the performance of the adaptive Bayes classifier in classifying the input-data-set. This is accomplished using only labeled samples, or otherwise, from the class-of-interest and unlabeled samples from the data set to be classified.

Two embodiments of the A Priori Probability and Probability of Error Estimation system are described below. Both embodiments use the system and method shown in FIG. 4. The primary difference between the two embodiments is the method used to implement the adaptive Bayes classifier training module 44. The first embodiment implements the adaptive Bayes classifier using a polynomial approximation of the class-of-interest posterior probability function. The second embodiment implements the adaptive Bayes classifier using Parzen kernels to approximate the class-of-interest posterior probability function. A mathematical description of the overall operation of the system will be described first.

Class-of-Interest a Priori Probability Estimation

Classification results provide a significant amount of information about a priori probabilities. It is shown below that the a priori probability of the class-of-interest, in the data set to be classified, can be estimated using classification results obtained from applying the adaptive Bayes classifier to the data set. It will also be shown that with an accurate estimate of a priori probability of the class-of-interest in the input-data-set, the performance of the adaptive Bayes classifier in classifying the input-data-set can be estimated.

The relationship between classification results and a priori probabilities is best illustrated by examining the performance of the classical Gaussian maximum likelihood classifier in classifying data into two classes, a class-of-interest and a class-other. The problem of estimating the a priori of the class-of-interest and the classification performance of the adaptive Bayes classifier will be addressed later.

Given the conditional probability density functions for the class-of-interest and class-other, the Gaussian maximum likelihood classifier can be used to classify an input-data-set. The maximum likelihood classification rule is:

$$\text{If:} P_{C_{int}} P(X/C_{int}) \geq P_{C_{other}} P(X/C_{other}) \qquad (53)$$

Classify X as the class-of-interest

Otherwise, classify X as the class-other where $P(X/C_{int})$=conditional probability density function for the class-of-interest $P(X/C_{other})$=conditional probability density function for class-other $P_{C_{int}}$=a priori probability of the class-of-interest $P_{C_{other}}$=a priori probability of class-other The maximum likelihood classification rule is illustrated in FIG. 1 where 12 is the probability density function for the class-of-interest, 14 is the probability density function for class-other, and 10 is the decision boundary.

The maximum likelihood classifier classifies samples from the input-data-set as either the class-of-interest or class-other with the following probabilities.

$$P_{C_{int}} \int_{R_{C_{int}}} P(X/C_{int})dX + P_{C_{other}} \int_{R_{C_{int}}} P(X/C_{other})dX = PC_{C_{int}} \qquad (54)$$

$$P_{C_{int}} \int_{R_{C_{other}}} P(X/C_{int})dX + \qquad (55)$$

$$P_{C_{unk}} \int_{R_{C_{other}}} P(X/C_{other})dX = PC_{C_{other}}.$$

From eq. (54) and (55), the following terms are defined:
Let $$PCC_{C_{int}} = \int_{R_{C_{int}}} P(X/C_{int})dX \qquad (56)$$

$$PE_{C_{int}} = \int_{R_{C_{other}}} P(X/C_{int})dX \qquad (57)$$

$$PCC_{C_{other}} = \int_{R_{C_{other}}} P(X/C_{other})dX \qquad (58)$$

$$PE_{C_{other}} = \int_{R_{C_{int}}} P(X/C_{other})dX \qquad (59)$$

where $PC_{C_{int}}$=probability a sample is classified as the class-of-interest $PCC_{C_{int}}$=probability-of-correct-classification for the class-of-interest $PE_{C_{int}}$=probability-of-error for the class-of-interest $PC_{C_{other}}$=probability a sample is classified as class-other $PCC_{C_{other}}$=probability-of-correct-classification for class-other $PE_{C_{other}}$=probability-of-error for class-other and the regions of integration in eqs. (56), (57), (58), and (59) are defined as $R_{C_{int}}$=region of feature space where samples are classified as class-of-interest—i.e., region for which $P_{C_{int}} P(X/C_{int}) \geq P_{C_{int}} P(X/C_{other})$ $R_{C_{other}}$=region of feature space where samples are classified as unknown—i.e., region for which $P_{C_{int}} P(X/C_{int}) < P_{C_{int}} P(X/C_{other})$ Using these definitions, equation (54) and (55) can be rewritten as:

$$P_{C_{int}} PCC_{C_{int}} + P_{C_{other}} PE_{C_{other}} = PC_{C_{int}} \qquad (60)$$

$$P_{C_{int}} PE_{C_{int}} + P_{C_{other}} PCC_{C_{int}} = PC_{C_{other}} \qquad (61)$$

Constraints that apply are:

$$P_{C_{other}} = 1 - P_{C_{int}} \qquad (62)$$

$$PE_{C_{int}} = 1 - PCC_{C_{int}} \qquad (63)$$

$$PE_{C_{other}} = 1 - PCC_{C_{int}} \qquad (64)$$

Applying these constraints, we can rewrite equations (60) and (61) as $$P_{C_{int}} PCC_{C_{int}} + (1-P_{C_{int}})(1-PCC_{C_{other}}) = PC_{C_{int}} \qquad (65)$$

$$P_{C_{int}}(1-PCC_{C_{int}}) + (1-P_{C_{int}})PCC_{C_{other}} = PC_{C_{other}} \qquad (66)$$

If all the quantities in equations (65) and (66) are known, then the left and right sides of eq. (65) and eq. (66) must be equal. These two equation can be combined to provide a least squares criterion which can be minimized to estimate the a priori probability of the class-of-interest, $P_{C_{int}}$, namely $$J = [(P_{C_{int}} PCC_{C_{int}} (1-P_{C_{int}})(1-PCC_{C_{other}}) - PC_{C_{int}})^2 + (P_{C_{int}}(1-PCC_{C_{int}}) + (1-P_{C_{int}})PCC_{C_{other}} - PC_{C_{other}})^2] \qquad (67)$$

Differentiating J, eq. (67), with respect to the a priori probability $P_{C_{int}}$ we get:

$$\frac{\delta J}{\delta P_{C_{int}}} = 2[P_{C_{int}} \cdot PCC_{C_{int}} + (1-P_{C_{int}}) \cdot (1-PCC_{C_{other}}) - PC_{C_{int}}] \cdot \qquad (68)$$

$$(PCC_{C_{other}} - 1 + PCC_{C_{other}}) +$$

$$2[P_{C_{int}} \cdot (1-PCC_{C_{int}}) + (1-P_{C_{int}}) \cdot PCC_{C_{other}} - 1 + PC_{C_{int}}] \cdot$$

$$(1 - PCC_{C_{int}} - PCC_{C_{other}})$$

Setting the partial, eq. (68), to zero and solving for the a priori probability of the class-of-interest, $P_{C_{int}}$, we get $$P_{C_{int}} = \frac{PCC_{C_{other}} + PC_{C_{int}} - 1}{PCC_{C_{int}} + PCC_{C_{other}} - 1} \qquad (69)$$

Eq. (69) minimizes the least squares criteria, eq. (67), and provides a least square estimate of the class-of-interest a priori probability, $P_{C_{int}}$. If training samples are available for both classes, the probabilities on the right side of eq. (69), namely $PCC_{C_{int}}$, $PCC_{C_{other}}$, and $PC_{C_{int}}$, can be estimated using results obtained from classifying labeled data from the class-of-interest and class-other.

The use of eq. (69) for the class-of-interest a priori probability, is illustrated in the following example using simulated data.

Figure 2A:
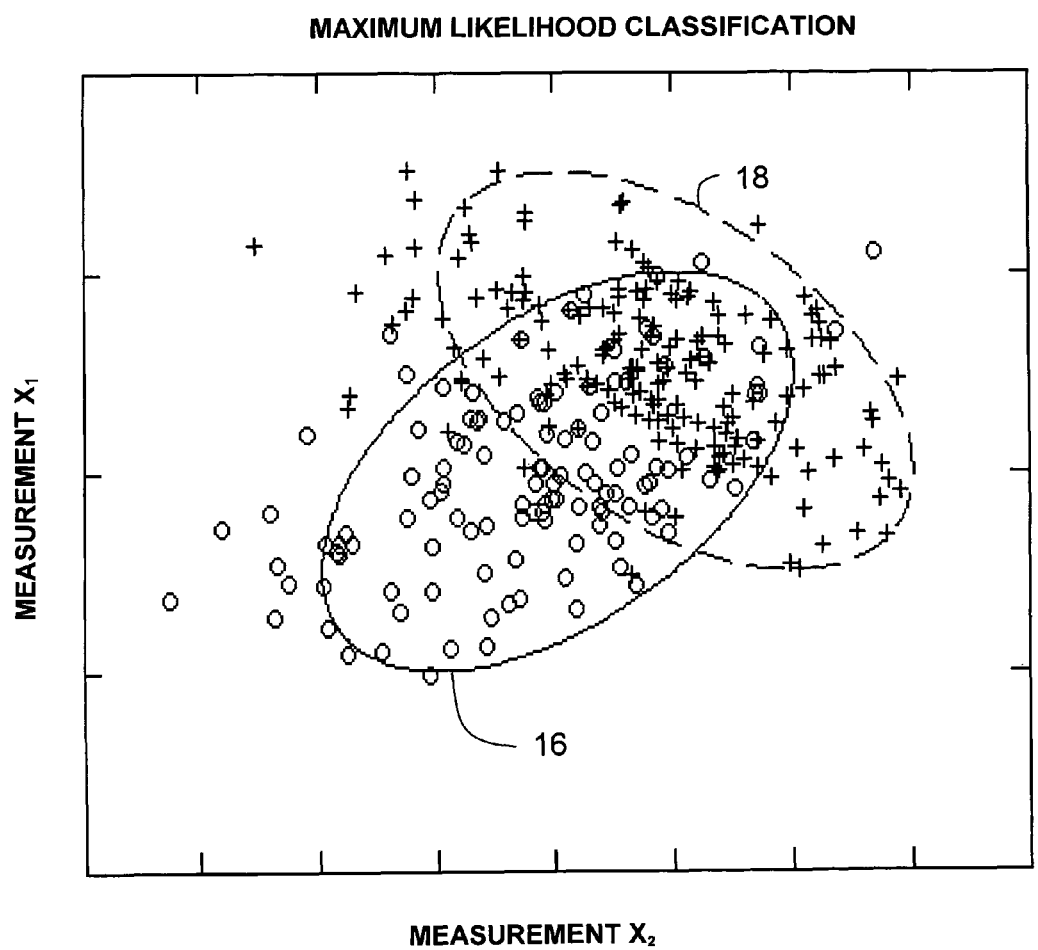

The simulated data in FIG. 2A was generated from two normal distributions with the generating statistics shown in FIG. 2B. As shown in FIG. 2B, the true a priori probabilities of the class-of-interest and class-other are $P_{C_{int}}=0.4$ and $P_{C_{other}}=0.6$ respectively. A total of 200 samples were generated, 80 from the class-of-interest and 120 from the other class. Shown in FIG. 2A is a plot of the two-sigma error ellipses for the class-of-interest 16 and the class-other 18 and the associated simulated data.

The data in FIG. 2A was classified using the Gaussian maximum likelihood classifier with the following decision rule $$\text{If:} W_{C_{int}} P(X/C_{int}) \geq W_{C_{other}} P(X/C_{other}) \quad (70)$$

Classify X as the class-of-interest

Otherwise, classify X as the class-other where $W_{C_{int}}$ and $_rW_{C_{other}}$ are arbitrary class-weights, substituted for the class a priori probabilities, $P_{C_{int}}$ and $P_{C_{other}}$, in eq. (53).

FIG. 3A shows a table of three classification results, obtained using the three sets of weights shown in table column 1 (20) and column 2 (22). The class-of-interest a priori probability estimates, $P_{C_{int}}$, (shown in the last column—30), were estimated using eq. (69). The probabilities on the right side of eq. (69), $PCC_{C_{int}}$, $PCC_{C_{other}}$, and $PC_{C_{int}}$, were obtained from the classification results. These probabilities are shown in the FIG. 3A table in columns 3 (24), 4 (26), and 5 (28).

In FIG. 3A, column, 30, it can be seen that all three classification results generate the same (correct) estimate of the class-of-interest a priori probability of $P_{C_{int}}=0.4$, using eq. (69). With modifications, this concept can be used with the adaptive Bayes classifier classification results to estimate the a priori probability of the class-of-interest in the data set to be classified.

FIG. 3B shows a table of classification results generated using the adaptive Bayes classifier, trained using 80 labeled data from the class-of-interest and 200 unlabeled data, obtained by combining the data from the two classes.

For this classification, the adaptive Bayes decision rule, eq. (9), is modified by substituting the class-of-interest weight, $W_{C_{int}}$, for the class-of-interest a priori probability $P_{C_{int}}$, in the class-of-interest posterior probability function, $P(C_{int}/X)$, eq. (10), or $$P(C_{int}/X)_{W_{C_{int}}} = \frac{W_{C_{int}} P(X/C_{int})}{P(X)} \quad (71)$$

The weighted class-of-interest posterior probability function, $$P(C_{int}/X)_{W_{C_{int}}}$$

was approximated using a second order polynomial, eq. (31), with $$P(C_{int}/X)_{W_{C_{int}}}$$

estimated by $$\hat{P}(C_{int}/X)_{W_{C_{int}}} \cong A^T_{W_{C_{int}}} F(X) \quad (72)$$

where F(X) is $$F(X)=(1,x_1,x_2,x_1x_2,x_1^2,x_2^2) \quad (73)$$

and the weighting vector $$A_{W_{C_{int}}} = (a_1, a_2, \ldots a_R)^T$$

was estimated using the expression $$A_{W_{C_{int}}} = W_{C_{int}} \left[ \frac{1}{N} \sum_{i=1}^{N} (F(X_i)F(X_i)^T) \right]^{-1} \cdot \frac{1}{M} \sum_{j=1}^{M} [F(X_j(C_{int}))] \quad (74)$$

where the class-of-interest weight $W_{C_{int}}$ is substituted for the class-of-interest a priori probability $P_{C_{int}}$ in eq. (29), the samples $(X_1, X_2, \ldots X_N)$ are a set of N=200 unlabeled samples from the two classes and the samples $(X_1(C_{int}), X_2(C_{int}), \ldots X_M(C_{int}))$ are a set of M=80 labeled samples from the class-of-interest.

Using the three class-of-interest weights, $$W_{C_{int}},$$

shown in FIG. 3B column 1 (32), the labeled and unlabeled data was classified three times using the adaptive Bayes classifier with the weighted class-of-interest posterior probability function, $$P(C_{int}/X)_{W_{C_{int}}},$$

or $$\hat{P}(C_{int}/X)_{W_{C_{int}}} \geq 1/2 \quad (75)$$

Classify X as the class-of-interest

Otherwise, classify X as the class-other

Comparing the values for $PCC_{C_{int}}$ and $PC_{C_{int}}$ shown in the table in FIG. 3A, columns 3 (24) and column 5 (28), with the values for $PCC_{C_{int}}$ and $PC_{C_{int}}$ shown in table in FIG. 3B columns 2 (34) and column 4 (38), it can be seen that the Gaussian maximum likelihood classifier and the adaptive Bayes classifier provide nearly identical estimates of $PCC_{C_{int}}$ and $PC_{C_{int}}$. Referencing FIG. 3B, the probability of correct classification for the class-of-interest, $PCC_{C_{int}}$ column 2 (34), was derived from classifying the labeled samples from the class-of-interest. Again referencing FIG. 3B, the probability that a sample is classified as the class-of-interest, $PC_{C_{int}}$, shown in column 4 (38), was derived from classifying the unlabeled data from the combined data set using the adaptive Bayes classifier.

However, as shown in FIG. 3B in column 3 (36), the estimated value for the probability of correct classification for the class-other, $PCC_{C_{other}}$, is listed as "unknown" since no labeled samples were available for the unknown class-other for use in estimating $PCC_{C_{other}}$.

However, although $PCC_{C_{other}}$ is listed as unknown, as shown in FIG. 3B column 3 (36), it is known that all three classification results will provide the same class-of-interest a priori probability estimate, per eq. (69). The goal then is to find three different values for the probability of correct classification for the unknown class-other, $PCC_{C_{other}}$ that provide the same class-of-interest a priori probability estimate, $P_{C_{int}}$. A least squares criterion is formulated below to solve for these two unknown probabilities.

For adaptive Bayes classifier applications, there are two unknowns in eq. (69), the probability of correct classification for class-other, $PCC_{C_{other}}$ and the class-of-interest a priori probability, $P_{C_{int}}$. In addition, from eq. (69) it can be seen that there is a nonlinear relationship between $PCC_{C_{other}}$ and $P_{C_{int}}$. As a result, there is no closed form solution available for solving eq. (69) for $PCC_{C_{other}}$ and $P_{C_{int}}$. Below an least square criterion is proposed which can be minimized using an optimization technique to solve for $PCC_{C_{other}}$ and $P_{C_{int}}$. Although only two equations are required to solve for $PCC_{C_{other}}$ and $P_{C_{int}}$, more than two equation can be used. The estimation process is illustrated below using three equations.

Let $P_{C_{int}}(1)$, $P_{C_{int}}(2)$, and $P_{C_{int}}(3)$ be the three a priori probability estimates obtained from three classification results using eq. (69). The following least squares criterion can be minimized to find the three unknown probabilities of correct classification for class-other, $PCC_{C_{other}}$ that provide the same class-of-interest a priori probability, $P_{C_{int}}$, estimate per eq. (69). Let $$J = (P_{C_{int}}(1) - P_{C_{int}}(2))^2 + (P_{C_{int}}(2) - (3))^2 \quad (76)$$

This criterion is minimized when $$P_{C_{int}}(1) = P_{C_{int}}(2) \quad (77)$$

$$P_{C_{int}}(2) = P_{C_{int}}(3) \quad (78)$$

From equation (69), let $$P_{C_{int}}(1) = \frac{PCC_{C_{other}}(1) + PC_{C_{int}}(1) - 1}{PCC_{C_{int}}(1) + PCC_{C_{other}}(1) - 1} \quad (79)$$

$$P_{C_{int}}(2) = \frac{PCC_{C_{other}}(2) + PC_{C_{int}}(2) - 1}{PCC_{C_{int}}(2) + PCC_{C_{other}}(2) - 1} \quad (80)$$

$$P_{C_{int}}(3) = \frac{PCC_{C_{other}}(3) + PC_{C_{int}}(3) - 1}{PCC_{C_{int}}(3) + PCC_{C_{other}}(3) - 1} \quad (81)$$

where $PCC_{C_{int}}(1)$, $PCC_{C_{int}}(2)$, and $PCC_{C_{int}}(3)$=probabilities of correct classification of the class-of-interest obtained from classifying the data with the adaptive Bayes classifier using three different values of the weight, $W_{C_{int}}(1)$, $W_{C_{int}}(2)$, $W_{C_{int}}(3)$ $PCC_{C_{other}}(1)$, $PCC_{C_{other}}(2)$, and $PCC_{C_{other}}(3)$=three (unknown) probabilities of correct classification of the other class obtained from classifying the data with the adaptive Bayes classifier using three different values of the weight, $W_{C_{int}}(1)$, $W_{C_{int}}(2)$, $W_{C_{int}}(3)$ $PC_{C_{int}}(1)$, $PC_{C_{int}}(2)$, and $PC_{C_{int}}(3)$=probabilities a sample is classified as the class-of-interest obtained from classifying the data with the adaptive Bayes classifier using three different values of the weight, $W_{C_{int}}(1)$, $W_{C_{int}}(2)$, $W_{C_{int}}(3)$.

Substituting equations (79), (80), and (81) into eq. (76) we get $$J = \quad (82)$$

$$\left(\frac{PCC_{C_{other}}(1) + PC_{C_{int}}(1) - 1}{PCC_{C_{int}}(1) + PCC_{C_{other}}(1) - 1} - \frac{PCC_{C_{other}}(2) + PC_{C_{int}}(2) - 1}{PCC_{C_{int}}(2) + PCC_{C_{other}}(2) - 1}\right)^2 +$$

$$\left(\frac{PCC_{C_{other}}(2) + PC_{C_{int}}(2) - 1}{PCC_{C_{int}}(2) + PCC_{C_{other}}(2) - 1} - \frac{PCC_{C_{other}}(3) + PC_{C_{int}}(3) - 1}{PCC_{C_{int}}(3) + PCC_{C_{other}}(3) - 1}\right)^2$$

This criterion can be minimized with respect to $PCC_{C_{other}}(1)$, $PCC_{C_{int}}(2)$, and $PCC_{C_{other}}(3)$ to obtain an estimate of class-of-interest a priori probability, $P_{C_{int}}$. However, there is no closed form solution available using this criterion, eq. (82). This criterion can only be minimized using an iterative optimization technique such as the Davidon-Fletcher-Powell (DFP) optimization algorithm, [I. L. Johnson, Jr., "The Davidon-Fletcher-Powell Penalty Function Method: A Generalized Iterative Technique for Solving parameter Optimization Problems", NASA Technical Note, NASA TN D-8251, National Aeronautics and Space Administration, Washington, D.C., May 1976]. The partials required for optimization are as follows:

$$\frac{\delta J}{\delta PCC_{C_{other}}(1)} = 2\left(\frac{PCC_{C_{other}}(1) + PC_{C_{int}}(1) - 1}{PCC_{C_{int}}(1) + PCC_{C_{other}}(1) - 1} - \frac{PCC_{C_{other}}(2) + PC_{C_{int}}(2) - 1}{PCC_{C_{int}}(2) + PCC_{C_{other}}(2) - 1}\right) \times$$

$$\left(\frac{1}{PCC_{C_{int}}(1) + PCC_{C_{other}}(1) - 1} - \frac{PCC_{C_{other}}(1) + PC_{C_{int}}(1) - 1}{(PCC_{C_{int}}(1) + PCC_{C_{other}}(1) - 1)^2}\right) \quad (83)$$

$$\frac{\delta J}{\delta PCC_{C_{other}}(2)} = 2\left[\left(\frac{PCC_{C_{other}}(1) + PC_{C_{int}}(1) - 1}{PCC_{C_{int}}(1) + PCC_{C_{other}}(1) - 1} - \frac{PCC_{C_{other}}(2) + PC_{C_{int}}(2) - 1}{PCC_{C_{int}}(2) + PCC_{C_{other}}(2) - 1}\right)^2 +\right.$$

$$\left.\left(\frac{PCC_{C_{other}}(2) + PC_{C_{int}}(2) - 1}{PCC_{C_{int}}(2) + PCC_{C_{other}}(2) - 1} - \frac{PCC_{C_{other}}(3) + PC_{C_{int}}(3) - 1}{(PCC_{C_{int}}(3) + PCC_{C_{other}}(3) - 1)^2}\right)\right] \times$$

$$\left[2\left(\frac{PCC_{C_{other}}(1) + PC_{C_{int}}(1) - 1}{PCC_{C_{int}}(1) + PCC_{C_{other}}(1) - 1} - \frac{PCC_{C_{other}}(2) + PC_{C_{int}}(2) - 1}{PCC_{C_{int}}(2) + PCC_{C_{other}}(2) - 1}\right) \times\right.$$

$$\left(\frac{-1}{PCC_{C_{int}}(21) + PCC_{C_{other}}(2) - 1} - \frac{PCC_{C_{other}}(2) + PC_{C_{int}}(2) - 1}{(PCC_{C_{int}}(2) + PCC_{C_{other}}(2) - 1)^2}\right) +$$

$$\left.\frac{1}{PCC_{C_{int}}(2) + PCC_{C_{other}}(2) - 1} - \frac{PCC_{C_{other}}(2) + PC_{C_{int}}(2) - 1}{(PCC_{C_{int}}(2) + PCC_{C_{other}}(2) - 1)^2}\right] \quad (84)$$

$$\frac{\delta J}{\delta PCC_{C_{other}}(3)} = 2\left(\frac{PCC_{C_{other}}(2) + PC_{C_{int}}(2) - 1}{PCC_{C_{int}}(2) + PCC_{C_{other}}(2) - 1} - \frac{PCC_{C_{other}}(3) + PC_{C_{int}}(3) - 1}{PCC_{C_{int}}(3) + PCC_{C_{other}}(3) - 1}\right) \times$$

$$\left(\frac{1}{PCC_{C_{int}}(3) + PCC_{C_{other}}(3) - 1} - \frac{PCC_{C_{other}}(31) + PC_{C_{int}}(3) - 1}{(PCC_{C_{int}}(3) + PCC_{C_{other}}(3) - 1)^2}\right) \quad (85)$$

The following constraints can be applied.

$$1 \geq PCC_{C_{other}}(1) \geq 0 \quad (86)$$

$$1 \geq PCC_{C_{other}}(2) \geq 0 \quad (87)$$

$$1 \geq PCC_{C_{other}}(3) \geq 0 \quad (88)$$

Minimizing the least squares criterion, eq. (82), using an optimization program, subject to the above constraints, yields three estimates of the probabilities of correct classification for class-other $PCC_{C_{other}}(1)$, $PCC_{C_{other}}(2)$, and $PCC_{C_{other}}(3)$. Using one of these estimates of $PCC_{C_{other}}$ and the associated estimates for $PC_{C_{int}}$ and $PCC_{C_{int}}$ from the same classification result, the class-of-interest a priori probability, $P_{C_{int}}$, can be estimated using eq. (69) or $$P_{C_{int}} = \frac{PCC_{C_{other}} + PC_{C_{int}} - 1}{PCC_{C_{int}} + PCC_{C_{other}} - 1} \quad (89)$$

The value calculated for $P_{C_{int}}$, in eq. (89), is an estimate of the class-of-interest a priori probability in the data set to be classified.

Estimating the Probability of Error for the Adaptive Bayes Classifier

Knowing the class-of-interest a priori probability in the input-data-set, we can now evaluate the performance of the adaptive Bayes classifier in classifying the input-data-set. This is accomplished as follows:

The input-data-set is reclassified using adaptive Bayes classifier, eq. (9), using the class-of-interest a priori probability estimate from eq. (89).

From these classification results, we obtain the true values of $PC_{C_{int}}$ and $PCC_{C_{int}}$. Using these estimates of $PC_{C_{int}}$, $PCC_{C_{int}}$, and the class-of-interest a priori probability, $P_{C_{int}}$, from eq. (89), we can now estimate the true value of the probabilities of correct classification for class-other $PCC_{C_{other}}$ as follows $$PCC_{C_{other}} = \frac{1}{(PCC_{C_{int}} - 1)}[PC_{C_{int}} + P_{C_{int}}(1 - PCC_{C_{int}}) - 1] \quad (90)$$

where eq. (90) is obtained by solving eq. (89) for $PCC_{C_{other}}$.

And finally, the classification performance of the adaptive Bayes classifier is estimated in terms of the probability of error, PE, as follows $$PE = PC_{C_{int}}(1 - PCC_{C_{int}}) + (1 - P_{C_{int}})(1 - PCC_{C_{other}}) \quad (91)$$

where $P_{C_{int}}$ is the class-of-interest a priori probability, from eq. (89), $PC_{C_{int}}$ and $PCC_{C_{int}}$ are obtained from reclassifying the labeled training samples from the class-of-interest and unlabeled samples for the input-data-set using the estimate of $P_{C_{int}}$ from eq. (89), and $PCC_{C_{other}}$ is calculated using eq. (91).

Below, two embodiments of the A Priori Probability and Probability of Error Estimation system are described. The first embodiment implements the adaptive Bayes classifier using a polynomial approximation of the class-of-interest posterior probability function. The second embodiment implements the adaptive Bayes classifier using Parzen kernels to approximate the class-of-interest posterior probability function.

DETAILED DESCRIPTION

Figure 5:
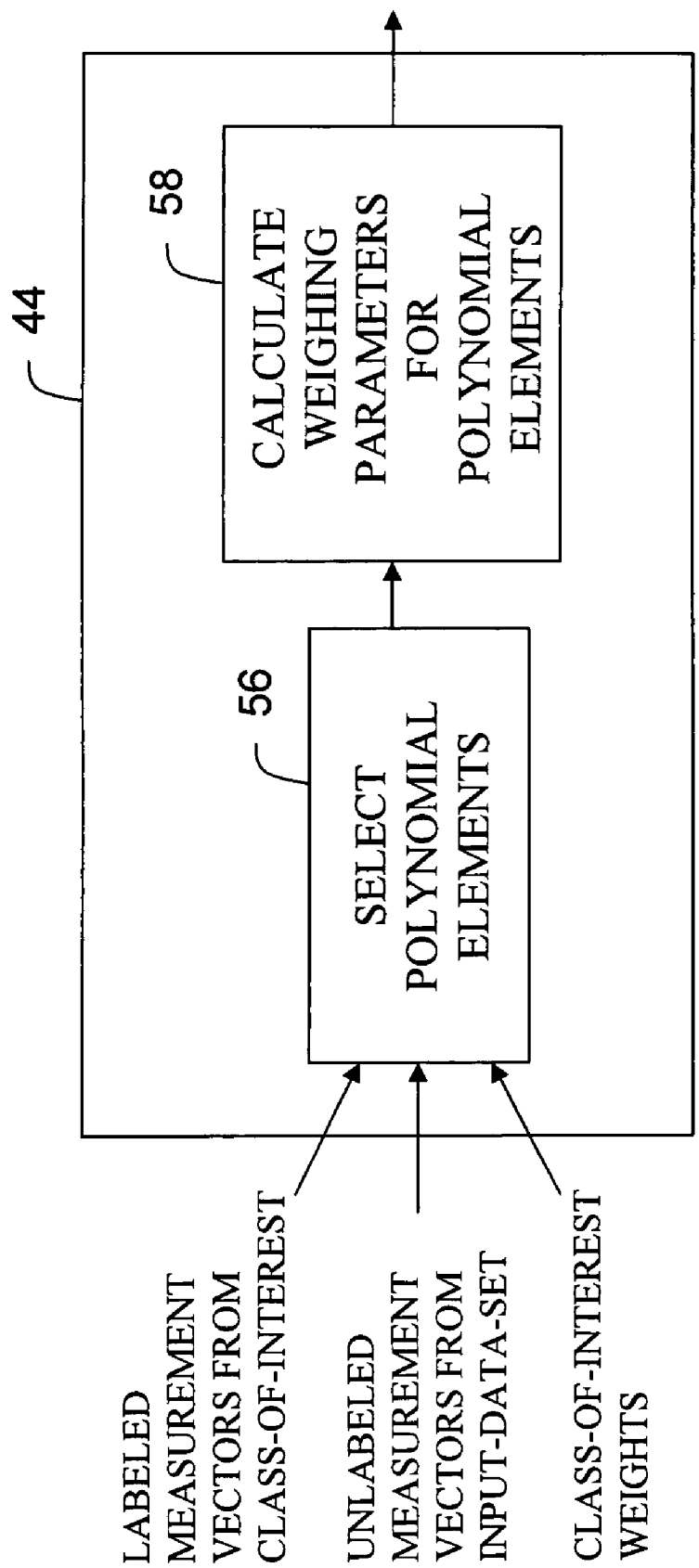
FIG. 5 shows the flow chart for the adaptive Bayes classifier training module 44 for the first embodiment. In this embodiment the adaptive Bayes classifier is implemented using a polynomial approximation of the class-of-interest posterior probability function, $\hat{P}(C_{int}/X)$.
Figure 7:
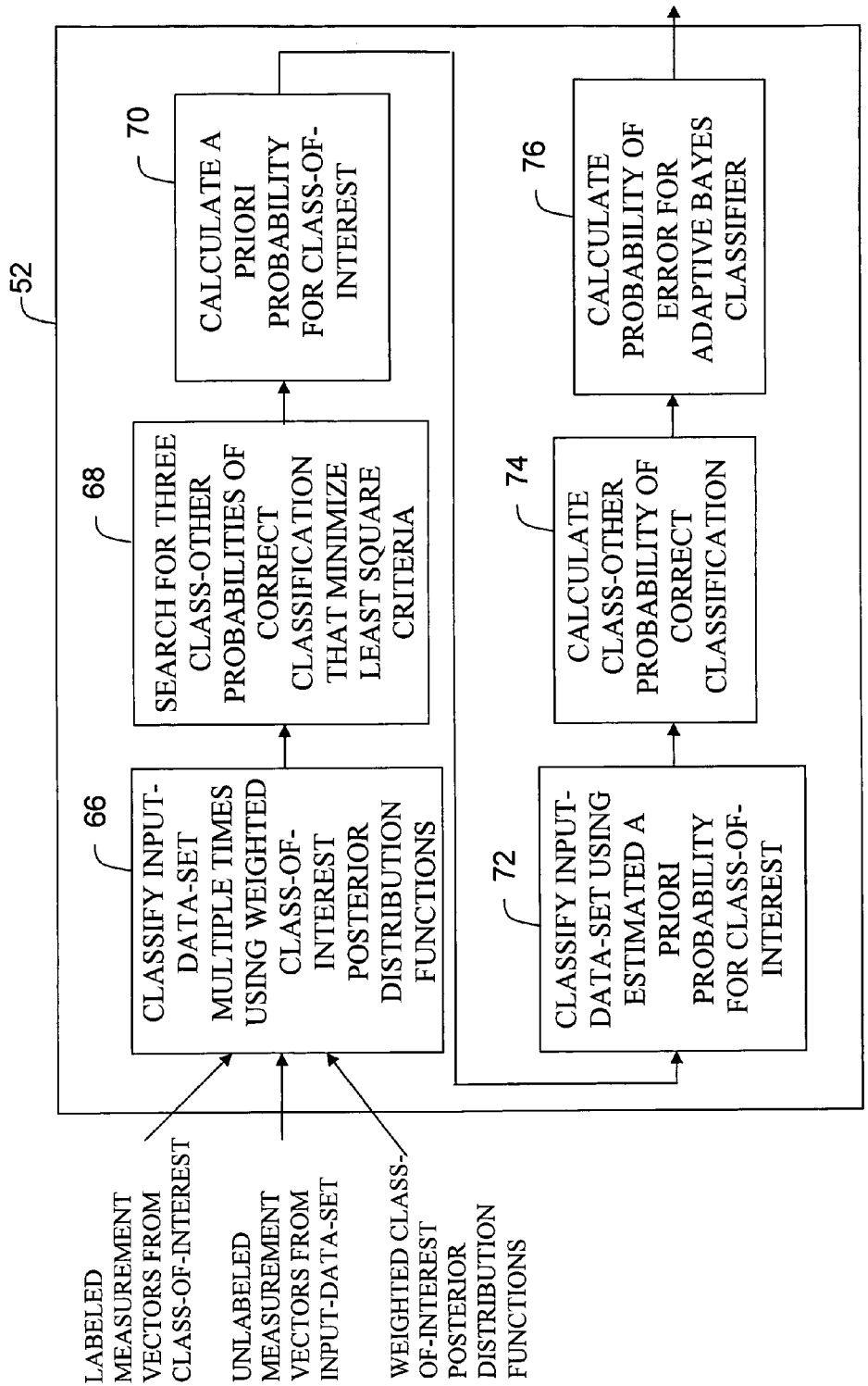
FIG. 7 shows a flow chart for the class-of-interest a priori probability estimation and adaptive Bayes classifier performance estimation module 52.

First Embodiment—FIGS. 4, 5, and 7

Again, shown in FIG. 4, is an A Priori Probability and Probability of Error Estimation system having an adaptive Bayes classifier training module 44, memory 46, a user interface device 48, a processing unit 50, an a priori probability and adaptive Bayes classifier performance estimation module 52, and an output device 54.

FIG. 5 shows a flow chart for the adaptive Bayes classifier training module 44 used in the first embodiment. In this embodiment, the adaptive Bayes classifier, using the weighted class-of-interest posterior probability function, $$P(C_{int}/X)_{W_{C_{int}}},$$

eq. (75), is implemented using a polynomial approximation of $$P(C_{int}/X)_{W_{C_{int}}}.$$

Referencing FIG. 5, the first step 56 is to select the elements of the polynomial to be used to approximate $$P(C_{int}/X)_{W_{C_{int}}}.$$

The polynomial elements are a function of the measurements and the order of the polynomial selected to approximate $$P(C_{int}/X)_{W_{C_{int}}}.$$

The polynomial elements are a vector of functions of the measurements, F(X), where $$F(X) = f(X)_1, f(X)_2, \ldots f(X)_n)^T \quad (92)$$

and n is the number of polynomial elements sued to approximate $$P(C_{int}/X)_{W_{C_{int}}}.$$

An example of polynomial elements for a second order polynomial for two dimensional measurements is shown in eq. (31).

Again referencing FIG. 5, in step 58, weighting parameters for the elements of F(X), are estimated which ensure a least square approximation of the weighted class-of-interest posterior probability function, $$P(C_{int}/X)_{W_{C_{int}}},$$

using the polynomial defined by F(X). The vector of weighting parameters, $$A_{W_{C_{int}}},$$

is estimated as follows $$A_{W_{C_{int}}} = W_{C_{int}} \left[ \frac{1}{N} \sum_{i=1}^{N} (F(X_i)F(X_i)^T) \right]^{-1} \cdot \frac{1}{M} \sum_{j=1}^{M} [F(X_j(C_{int}))] \quad (93)$$

where the weight $W_{C_{int}}$ replaces the class-of-interest a priori probability, $P_{C_{int}}$ in eq. (29), $(X_1, X_2, \ldots X_N)$ is a set of N unlabeled samples from the data set to be classified, and $(X_1(C_{int}), X_2(C_{int}), \ldots X_M(C_{int}))$ is a set of M labeled samples from the class-of-interest.

Thus a least squares approximation of the weighted class-of-interest posterior probability function, $$P(C_{int}/X)_{W_{C_{int}}},$$

is obtained, or $$\hat{P}(C_{int}/X)_{W_{C_{int}}} \cong A^T_{W_{C_{int}}} F(X) \qquad (94)$$

Step 58 is repeated multiple times to provide estimates of $$P(C_{int}/X)_{W_{C_{int}}}$$

for each input class-of-interest weight, $W_{C_{int}}$.

FIG. 7 shows a flow chart for the a priori probability and adaptive Bayes classifier performance estimation module 52. Referencing FIG. 7, the first step 66 is to classify the labeled samples from the class-of-interest and unlabeled samples from the input-data-set multiple times using the weighted adaptive Bayes decision rule using multiple a polynomial approximation of the class-of-interest posterior probability function $$P(C_{int}/X)_{W_{C_{int}}}$$

once for each of the class-of-interest weights, $W_{C_{int}}$. The adaptive Bayes decision rule using class-of-interest weights is:

$$P(C_{int}/X)_{W_{C_{int}}} \geq 1/2 \qquad (95)$$

Classify X as the class-of-interest

Otherwise, classify X as the class-other

Again referencing FIG. 7, the next step 68 uses the multiple estimates of $PCC_{C_{int}}$ and $PC_{C_{int}}$ obtained in step 66 from multiple classification to solve for multiple values of the probability of correct classification of class-other, $PCC_{C_{other}}$ that minimize a least squares criteria with constraints. For example, for three classifications, the least squares criterion is $$J = \qquad (96)$$

$$\left( \frac{PCC_{C_{other}}(1) + PC_{C_{int}}(1) - 1}{PCC_{C_{int}}(1) + PCC_{C_{other}}(1) - 1} - \frac{PCC_{C_{other}}(2) + PC_{C_{int}}(2) - 1}{PCC_{C_{int}}(2) + PCC_{C_{other}}(2) - 1} \right)^2 +$$

-continued $$\left( \frac{PCC_{C_{other}}(2) + PC_{C_{int}}(2) - 1}{PCC_{C_{int}}(2) + PCC_{C_{other}}(2) - 1} - \frac{PCC_{C_{other}}(3) + PC_{C_{int}}(3) - 1}{PCC_{C_{int}}(3) + PCC_{C_{other}}(3) - 1} \right)^2$$

The minimization of eq. (96), using an optimization procedure, yields three estimates of the probabilities of correct classification of the class-other $PCC_{C_{other}}(1)$, $PCC_{C_{other}}(2)$, and $PCC_{C_{other}}(3)$.

Reference FIG. 7, in step 70, using one of these estimates of $PCC_{C_{other}}$ and the associated estimates for $PC_{C_{int}}$ and $PCC_{C_{int}}$ from the same classification result, the a priori probability for the class-of-interest, $P_{C_{int}}$, in the input-data-set, is estimated using the expression $$P_{C_{int}} = \frac{PCC_{C_{other}} + PC_{C_{int}} - 1}{PCC_{C_{int}} + PCC_{C_{other}} - 1} \qquad (97)$$

Again referencing FIG. 7, the next step 72 uses the estimated a priori probability for the class-of-interest, $PC_{C_{int}}$, from step 70, to again classify the training labeled samples from the class-of-interest and unlabeled samples from the input-data-set using the Adaptive Bayes classifier, eq. (9), or If: $\hat{P}(C_{int}/X) \geq 1/2$, \qquad (98)

Classify X as the class-of-interest

Otherwise, classify X as the class-other

To perform this classification, a new least squares approximation of the class-of-interest posterior probability function, $\hat{P}(C_{int}/X)$, is required. This is accomplished by obtaining a new estimate of $A^T F(X)$ where $$A = P_{C_{int}} \left[ \frac{1}{N} \sum_{i=1}^{N} (F(X_i) F(X_i)^T) \right]^{-1} \cdot \frac{1}{M} \sum_{j=1}^{M} [F(X_j(C_{int}))] \qquad (99)$$

where $(X_1, X_2, \ldots X_N)$ is a set of N unlabeled samples from the data set to be classified, and $(X_1(C_{int}), X_2(C_{int}), \ldots X_M(C_{int}))$ is a set of M labeled samples from the class-of-interest and F(X) is a vector of elements the polynomial used to approximate $\hat{P}(C_{int}/X)$, or $$F(X) = (f(X)_1, f(X)_2, \ldots f(X)_n)^T \qquad (100)$$

and $$\hat{P}(C_{int}/X) \cong A^T F(X) \qquad (101)$$

This classification result from step 72 is used to estimate the true values for $PC_{C_{int}}$ and $PCC_{C_{int}}$.

Again referencing FIG. 7, the next step 74 uses the estimates of $PC_{C_{int}}$ and $PCC_{C_{int}}$ from step 72 and the estimated class-of-interest a priori probability, $P_{C_{int}}$, from step 70, to estimate the true value of the probability of correct classification for class-other, $PCC_{C_{other}}$ using the following expression $$PCC_{C_{other}} = \frac{1}{(PCC_{C_{int}} - 1)} [PC_{C_{int}} + P_{C_{int}}(1 - PCC_{C_{int}}) - 1] \qquad (102)$$

where eq. (102) above is obtained by solving eq. (97) for $PCC_{C_{other}}$.

Again referencing FIG. 7, in step 76, the performance of the adaptive Bayes classifier is estimated in terms of the probability of error, PE. The probability of error, PE, is estimated, using the class-of-interest a priori probability estimate, $P_{C_{int}}$, from step 70, the estimates of $PC_{C_{int}}$ and $PCC_{C_{int}}$ from step 72 and the estimate of $PCC_{C_{other}}$ from step 74, using the following expression $$PE = P_{C_{int}}(1 - PCC_{C_{int}}) + (1 - P_{C_{int}})(1 - PCC_{C_{other}}) \quad (103)$$

Thus it can be seen that the first embodiment of the A Priori Probability and Probability of Error Estimation system provides an estimate of the class-of-interest a priori probability, $P_{C_{int}}$, in the input-data-set and an estimate of the probability of error, PE, for the adaptive Bayes classifier, using a polynomial approximation of the class-of-interest posterior probability function, $\hat{P}(C_{C_{int}}/X)$, using only label samples, or otherwise, from the class-of-interest and unlabeled samples from the input-data-set.

DETAILED DESCRIPTION

Second Embodiment—FIGS. 4, 6, 7, 8, 9, and 10

Again, shown in FIG. 4, is an A Priori Probability and Probability of Error Estimation system having an adaptive Bayes classifier training module 44, memory 46, a user interface device 48, a processing unit 50, an a priori probability and adaptive Bayes classifier performance estimation module 52, and an output device 54.

Figure 6:
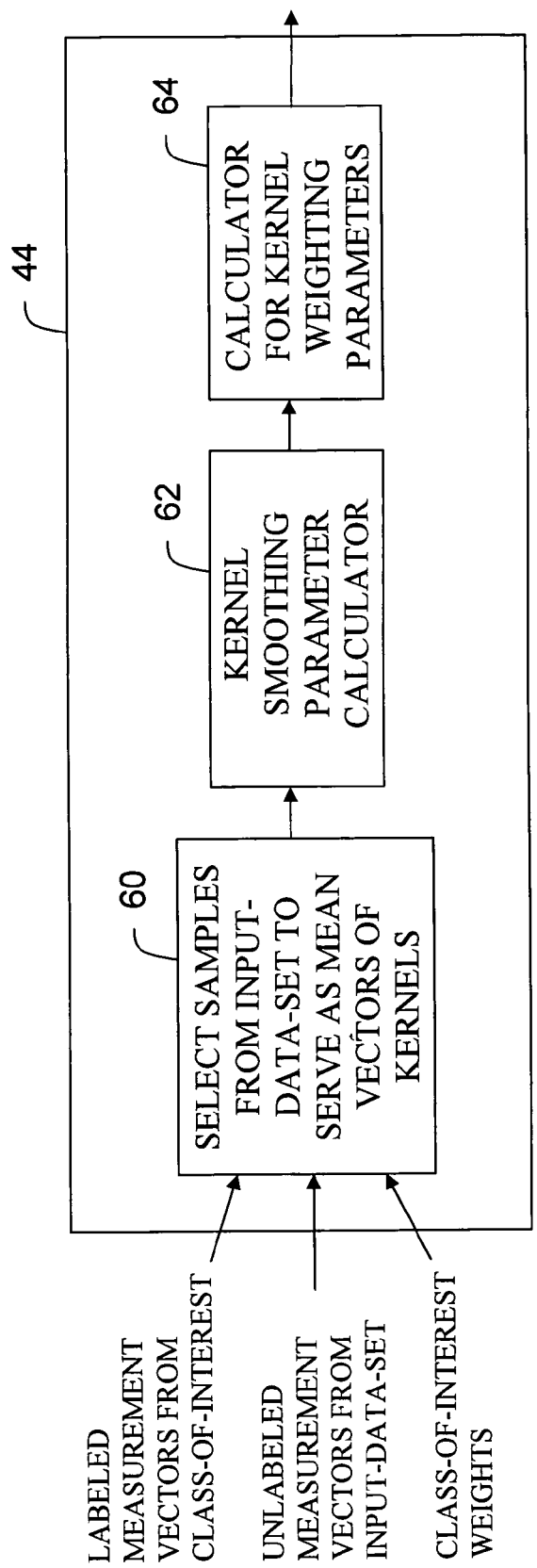
FIG. 6 shows the flow chart for the adaptive Bayes classifier training module 44 for the second embodiment. In this embodiment the adaptive Bayes classifier is implemented using a Parzen kernel approximation of the class-of-interest posterior probability function, $\hat{P}(C_{int}/X)$.

FIG. 6 shows the flow chart for the adaptive Bayes classifier training module 44 for the second embodiment. In this embodiment the adaptive Bayes classifier, eq. (9), is implemented using a Parzen kernel approximation of the weighted class-of-interest posterior probability function, $$P(C_{int}/X)_{W_{C_{int}}}, \quad \text{eq. (71)}$$

eq. (71).

Referencing FIG. 6, in the first step 60, a set of R unlabeled samples, $S = \{X_1, X_2, \ldots X_R\}$, are randomly selected from the input-data-set. These samples are used as the mean vectors of the Parzen kernels, eq. (36).

Again referencing FIG. 6, in step 62 the smoothing parameter, H, is estimated for the Parzen kernels using the maximum likelihood estimator, or $$\hat{H} = \sum_{j=1}^{N} \sum_{i=1}^{R} \frac{P_{k_i} \cdot P(X_j/k_i)}{P(X_j)} \cdot \left[ \frac{1}{2}(X_j - X_i)(X_j - X_i)^T \right] \quad (104)$$

where, given an initial value for $H_0$ and N unlabeled samples $(X_1, X_2, \ldots X_N)$ from the data set to be classified, an updated value is obtained for H. The log likelihood function, eq. (50), is evaluated after each update to H. This process is repeated until there is no further improvement in the log likelihood function.

Again referencing FIG. 6, in step 64, the weighting vector for the Parzen kernels, $$A_{W_{C_{int}}} = (a_1, a_2, \ldots a_R)^T,$$

is estimated as follows $$A_{W_{C_{int}}} = W_{C_{int}} \left[ \frac{1}{N} \sum_{i=1}^{N} (F(X_i) F(X_i)^T) \right]^{-1} \cdot \frac{1}{M} \sum_{j=1}^{M} [F(X_j(C_{int}))] \quad (105)$$

where the weight $W_{C_{int}}$ replaces the a priori probability, $P_{C_{int}}$, in eq. (29), $(X_1, X_2, \ldots X_N)$ is a set of N unlabeled samples from the input-data-set, and $(X_1(C_{int}), X_2(C_{int}), \ldots X_M(C_{int}))$ is set of M labeled samples from class-of-interest.

The vector F(X) in eq. (105), is defined as $$F(X) = \left[ \frac{P(X/k_1)}{P(X)}, \frac{P(X/k_2)}{P(X)}, \ldots \frac{P(X/k_R)}{P(X)} \right]^T \text{ where} \quad (106)$$

$$P(X/k_i) = \frac{1}{2\pi^{d/2}|H|^{1/2}} e^{-1/2(X-X_i)^T H^{-1}(X-X_i)} \text{ and} \quad (107)$$

$$P(X) = \frac{1}{R} \sum_{i=1}^{R} P(X/k_i) \quad (108)$$

Thus a least squares approximation of the weighted class-of-interest posterior probability function, $$P(C_{int}/X)_{W_{C_{int}}},$$

is obtained using Parzen kernels, where $$\hat{P}(C_{C_{int}}/X) \approx A^T F(X) \quad (109)$$

Step 64 is repeated multiple times to provide estimates of $$P(C_{int}/X)_{W_{C_{int}}}$$

for each input class-of-interest weight, $W_{C_{int}}$.

FIG. 7 shows a flow chart for the a priori probability and adaptive Bayes classifier performance estimation module 52. Referencing FIG. 7, the first step 66 is to classify multiple times, the labeled samples from the class-of-interest and unlabeled samples from the input-data-set multiple times using the adaptive Bayes classifier and multiple a Parzen kernel approximation of the class-of-interest posterior probability function $$P(C_{int}/X)_{W_{C_{int}}}$$

estimated in step 64. The adaptive Bayes decision rule using the weighted class-of-interest posterior probability functions is:

$$P(C_{int}/X)_{W_{C_{int}}} \geq 1/2 \quad (110)$$

Classify X as the class-of-interest

Otherwise, classify X as the class-other

Again referencing FIG. 7, the next step 68 uses the multiple estimates of $PCC_{C_{int}}$ and $PC_{C_{int}}$ obtained in step 66 from multiple classification to solve for multiple values of the probability of correct classification of class-other, $PCC_{C_{other}}$, that minimize a least squares criteria with constraints. For example, for three classifications, the least squares criterion is $$J = \left( \begin{array}{cc} PCC_{C_{other}}(1) + & PCC_{C_{other}}(2) + \\ \frac{PC_{C_{int}}(1) - 1}{PCC_{C_{int}}(1) +} & \frac{PC_{C_{int}}(2) - 1}{PCC_{C_{int}}(2) +} \\ PCC_{C_{other}}(1) - 1 & PCC_{C_{other}}(2) - 1 \end{array} \right)^2 + \quad (111)$$

$$\left(\begin{array}{cc} PCC_{C_{other}}(2) + & PCC_{C_{other}}(3) + \\ \dfrac{PC_{C_{int}}(2) - 1}{PCC_{C_{int}}(2) +} & \dfrac{PC_{C_{int}}(3) - 1}{PCC_{C_{int}}(3) +} \\ PCC_{C_{other}}(2) - 1 & PCC_{C_{other}}(3) - 1 \end{array}\right)^2$$

The minimization of eq. (111) using an optimization procedure, yields three estimates of the probabilities of correct classification of the class-other $PCC_{C_{other}}(1)$, $PCC_{C_{other}}(2)$, and $PCC_{C_{other}}(3)$.

Reference FIG. 7, in step 70, using one of these estimates of $PCC_{C_{other}}$ and the associated estimates for $PC_{C_{int}}$ and $PCC_{C_{int}}$ from the same classification result, the a priori probability for the class-of-interest, $P_{C_{int}}$, in the input-data-set, is estimated using the expression $$P_{C_{int}} = \frac{PCC_{C_{other}} + PC_{C_{int}} - 1}{PCC_{C_{int}} + PCC_{C_{other}} - 1} \quad (112)$$

Again referencing FIG. 7, the next step 72 uses the estimated a priori probability for the class-of-interest, $PC_{C_{int}}$, from step 70, to again classify the training labeled samples from the class-of-interest and unlabeled samples from the input-data-set using the Adaptive Bayes classifier, eq. (9), or If: $\hat{P}(C_{int}/X) \geq \frac{1}{2}$, (113)

Classify X as the class-of-interest

Otherwise, classify X as the class-other

To perform this classification, a new least squares approximation of the class-of-interest posterior probability function, $\hat{P}(C_{int}/X)$, is required. This is accomplished by obtaining a new estimate of $A^T F(X)$ where $$A = P_{C_{int}} \left[\frac{1}{N}\sum_{i=1}^{N}(F(X_i)F(X_i)^T)\right]^{-1} \cdot \frac{1}{M}\sum_{j=1}^{M}[F(X_j(C_{int}))] \quad (114)$$

where $(X_1, X_2, \ldots X_N)$ is a set of N unlabeled samples from the data set to be classified, and $(X_1(C_{int}), X_2(C_{int}), \ldots X_M(C_{int}))$ is a set of M labeled samples from the class-of-interest The vector $F(X)$ in eq. (114), is defined as $$F(X) = \left[\frac{P(X/k_1)}{P(X)}, \frac{P(X/k_2)}{P(X)}, \ldots \frac{P(X/k_R)}{P(X)}\right]^T \text{ where} \quad (115)$$

$$P(X/k_i) = \frac{1}{2\pi^{d/2}|H|^{1/2}} e^{-1/2(X-X_i)^T H^{-1}(X-X_i)} \text{ and} \quad (116)$$

$$P(X) = \frac{1}{R}\sum_{i=1}^{R} P(X/k_i) \quad (117)$$

and $$\hat{P}(C_{int}/X) \cong A^T F(X) \quad (118)$$

The classification results from step 72 is used to estimate the true values for $PC_{C_{int}}$ and $PCC_{C_{int}}$.

Again referencing FIG. 7, the next step 74 uses the estimates of $PC_{C_{int}}$ and $PCC_{C_{int}}$ from step 72 and the estimated a priori probability of the class-of-interest, $P_{C_{int}}$, from step 70, to estimate the true value of $PCC_{C_{other}}$ using the following expression $$PCC_{C_{other}} = \frac{1}{(PCC_{C_{int}} - 1)}[PC_{C_{int}} + P_{C_{int}}(1 - PCC_{C_{int}}) - 1] \quad (119)$$

where eq. (119) above is obtained by solving eq. (112) for $PCC_{C_{other}}$.

Again referencing FIG. 7, in step 76, the performance of the adaptive Bayes classifier is estimated in terms of the probability of error, PE. The probability of error, PE, is estimated, using the class-of-interest a priori probability estimate, $P_{C_{int}}$, from step 70, the estimates of $PC_{C_{int}}$ and $PCC_{C_{int}}$ from step 72 and the estimate of $PCC_{C_{other}}$ from step 74, and the following expression $$PE = P_{C_{int}}(1 - PCC_{C_{int}}) + (1 - P_{C_{int}})(1 - PCC_{C_{other}}) \quad (120)$$

Thus it can be seen that the second embodiment of the A Priori Probability and Probability of Error Estimation system provides an estimate of the a priori probability of the class-of-interest, $P_{C_{int}}$, in the input data set and an estimate of the probability of error for the adaptive Bayes classifier, PE, using a Parzen kernel approximation of the class-of-interest posterior probability function, $\hat{P}(C_{int}/X)$, using only label samples, or otherwise, from the class-of-interest and unlabeled samples from the input-data-set.

Figure 8A:
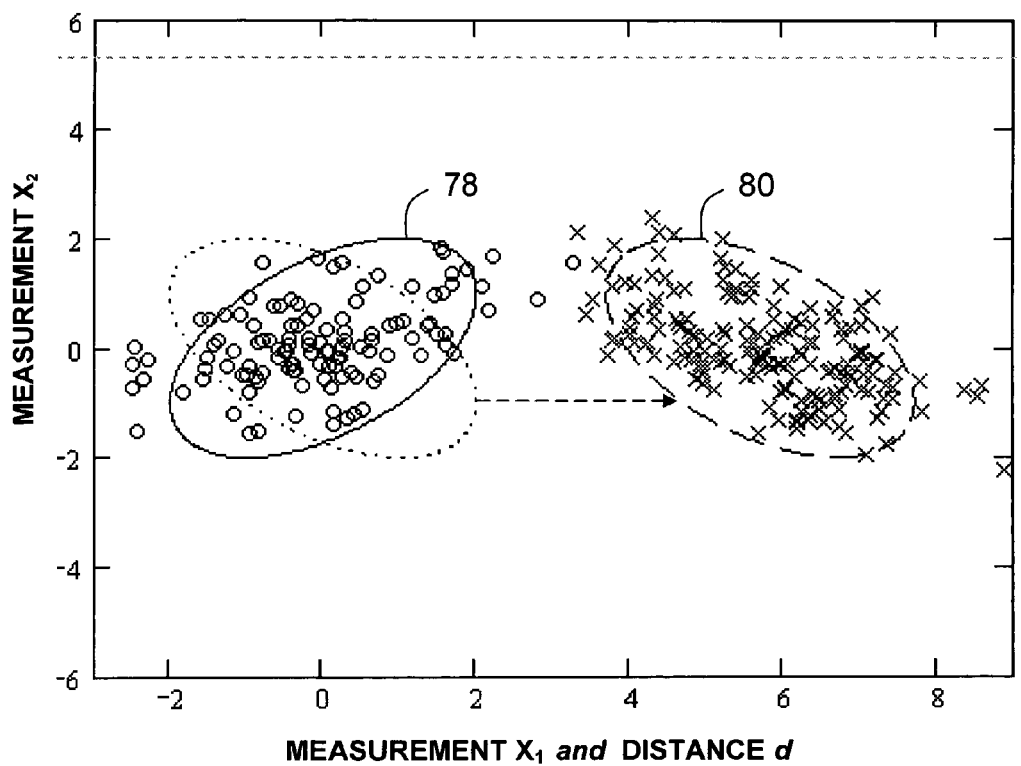

Performance Evaluation Results for the a Priori Probability and Probability of Error Estimation System on Simulated Data The A Priori Probability and Probability of Error Estimation system was tested using simulated data. The simulated data was generated from two bi-variant normal distributions using the generating statistics shown in FIG. 8B. As shown in FIG. 8B, the class-of-interest a priori probability was $P_{C_{int}} = 0.4$ A total of 200 samples were generated, 80 from the class-of-interest and 120 from class-other. These two data sets were combined to provide 200 unlabeled samples from both classes. This data is plotted in FIG. 8A which also shows two-sigma error ellipses for the class-of-interest 78 and class-other 80.

As shown in FIG. 8A, initially the means of both distributions are both equal. The distance between the means of distributions is increased by incrementing the first mean of class-other, $$\mu_{1_{C_{other}}},$$

from 0 to 6 in steps of 0.3 as shown in FIG. 8A.

After each increment of mean $$\mu_{1_{C_{other}}},$$

the A Priori Probability and Probability of Error Estimation system is estimates the class-of-interest a prior probability $P_{C_{int}}$, and estimates the probability of error, PE for the adaptive Bayes classifier. From FIG. 8A, it can be seen that initially the overlap between the probability density functions is high and decreases as distance between the means increases. This procedure was repeated for the both embodiments of the A Priori Probability and Probability of Error Estimation. In the tests of the two embodiments, the class-of-interest a priori probability, $P_{C_{int}}$, and the probability of error, PE, estimate for the adaptive Bayes classifier were estimated using only labeled samples from the class-of-interest and unlabeled samples from the two classes.

For comparison, at each step, the probability of error is calculated using the Gaussian Maximum classifier. The Gaussian Maximum likelihood classifier used estimated class means and covariances derived from labeled samples from the class-of-interest and class-other; and the true a priori probability of the class-of-interest, in classifying the data. The same data was used for both training and test. The Gaussian Maximum Likelihood classifier results are an estimate of the true probability of error.

Figure 9A:
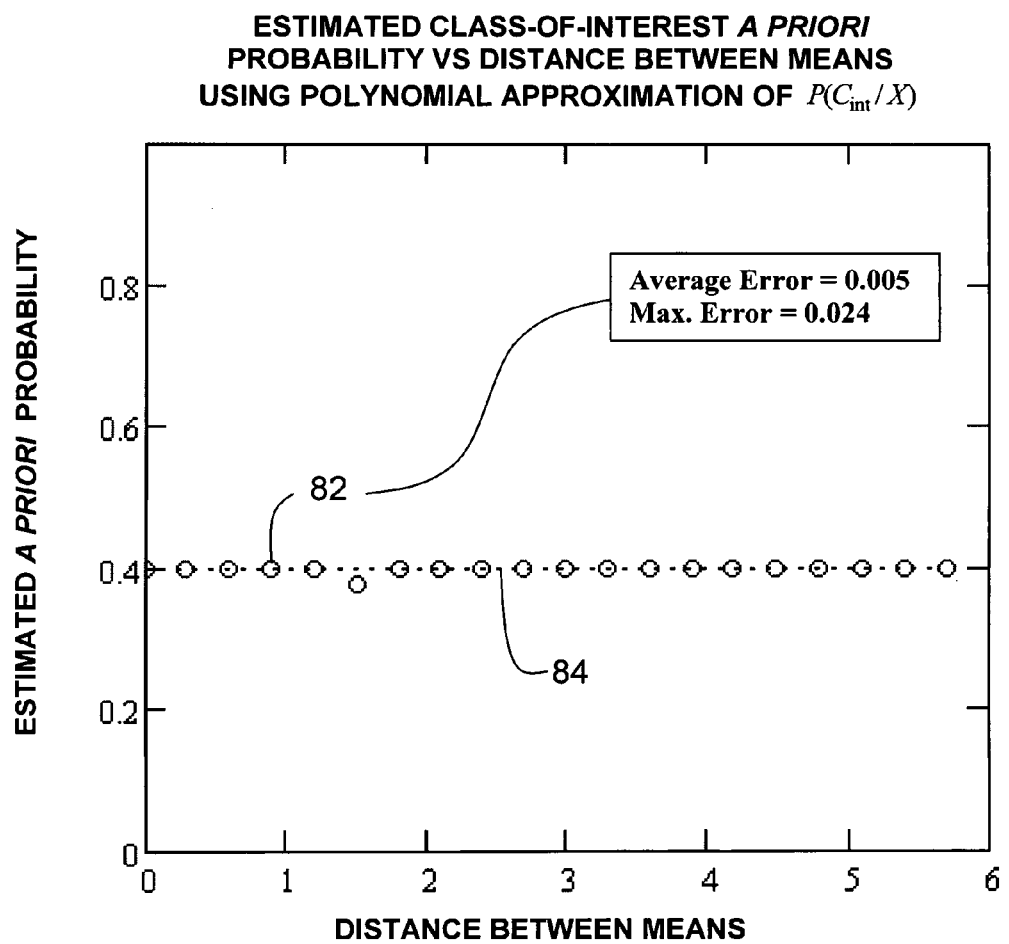
FIGS. 9A and 9B—where

Test Results for the First Embodiment—a Priori Probability and Probability of Error Estimation Using an Adaptive Bayes Classifier Based on Least Square Polynomial Approximation of the Posterior Probability Function of the Class-of-Interest FIG. 9A shows a plot of the estimated class-of-interest a priori probability, $P_{C_{int}}$, 82, and the true class-of-interest a priori probability, 84, versus distance between the means of the two probability density functions. The true class-of-interest a priori probability is $P_{C_{int}}=0.4$. These estimates were obtained using the first embodiment of the A Priori Probability and Probability of Error Estimation system using a second order polynomial approximation of the class-of-interest posterior probability function. As shown in FIG. 9A, the average error in the class-of-interest a priori probability estimate $P_{C_{int}}$, is 0.005, 82, this is the one-standard deviation difference between the estimated and true a priori probability, $P_{C_{int}}$. Again referencing FIG. 9A, it can be seen that the maximum error in the class-of-interest a priori probability estimate is 0.024, 82.

Figure 9B:
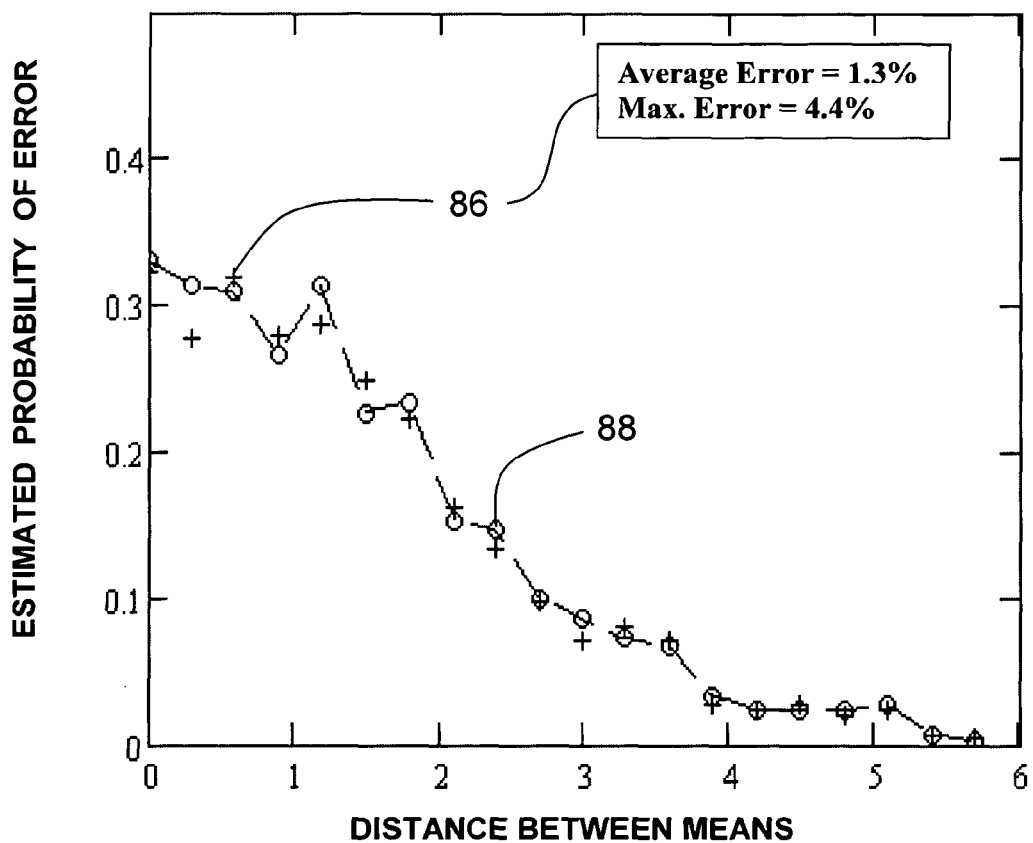

FIG. 9B, shows a plot of the predicted probability of error 86 of the adaptive Bayes classifier and the Gaussian Maximum Likelihood estimate 88 of the probability of error versus the distance between the means of the two density functions. Again this estimate was obtained using the first embodiment of the A Priori Probability and Probability of Error Estimation system with a second order polynomial approximation of the class-of-interest posterior probability function. Also shown in FIG. 9B is the average error in the probability of error estimate, PE, is 1.3%, 86. This estimate of PE is the one-standard deviation different between the estimated probability of error from the adaptive Bayes classifier and the probability of error 88 as measured by the Gaussian Maximum Likelihood classifier. Again referencing FIG. 9B, it can be seen that the maximum error in the probability of error estimate 86 is 4.4%.

Figure 10A:
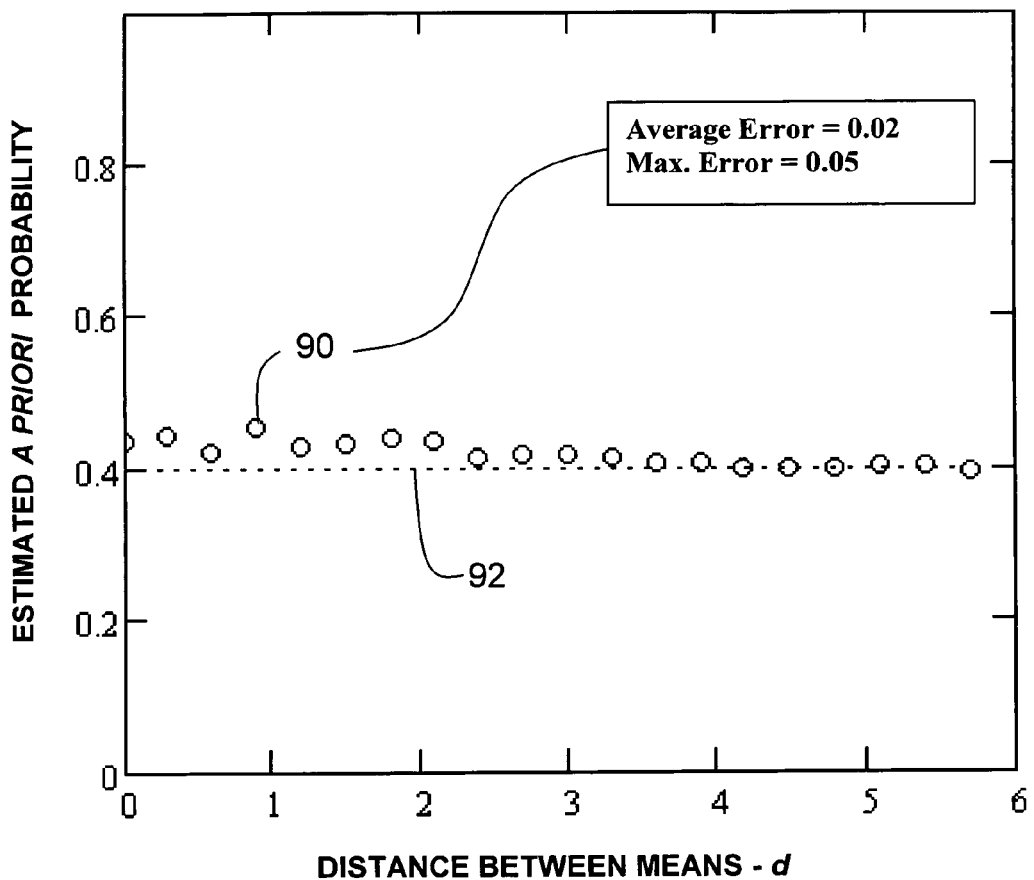
FIGS. 10A and 10B—where

Test Results for the Second Embodiment—a Priori Probability and Probability of Error Estimation Using an Adaptive Bayes Classifier Based on Least Square Parzen Kernel Approximation of the Class-of-Interest Posterior Probability Function FIG. 10A shows a plot of the estimated class-of-interest a priori probability, $P_{C_{int}}$, 90, and the true class-of-interest a priori, 92, versus distance between the means of the two probability density functions. The true class-of-interest a priori probability is $P_{C_{int}}=0.4$. These class-of-interest a priori probability estimates were obtained using the second embodiment of the A Priori Probability and Probability of Error Estimation system with a Parzen kernel approximation of the class-of-interest posterior probability function. In this test, the class-of-interest posterior probability function was approximated using twenty Parzen kernels. As shown in FIG. 10A, the average error in the class-of-interest a priori probability estimate, $P_{C_{int}}$ is 0.02, 90. This error is the one-standard deviation difference from the estimated and true class-of-interest a priori probability. Again referencing FIG. 10A, it can be seen that the maximum error in the class-of-interest a priori probability estimate which is 0.05, 90.

Figure 10B:
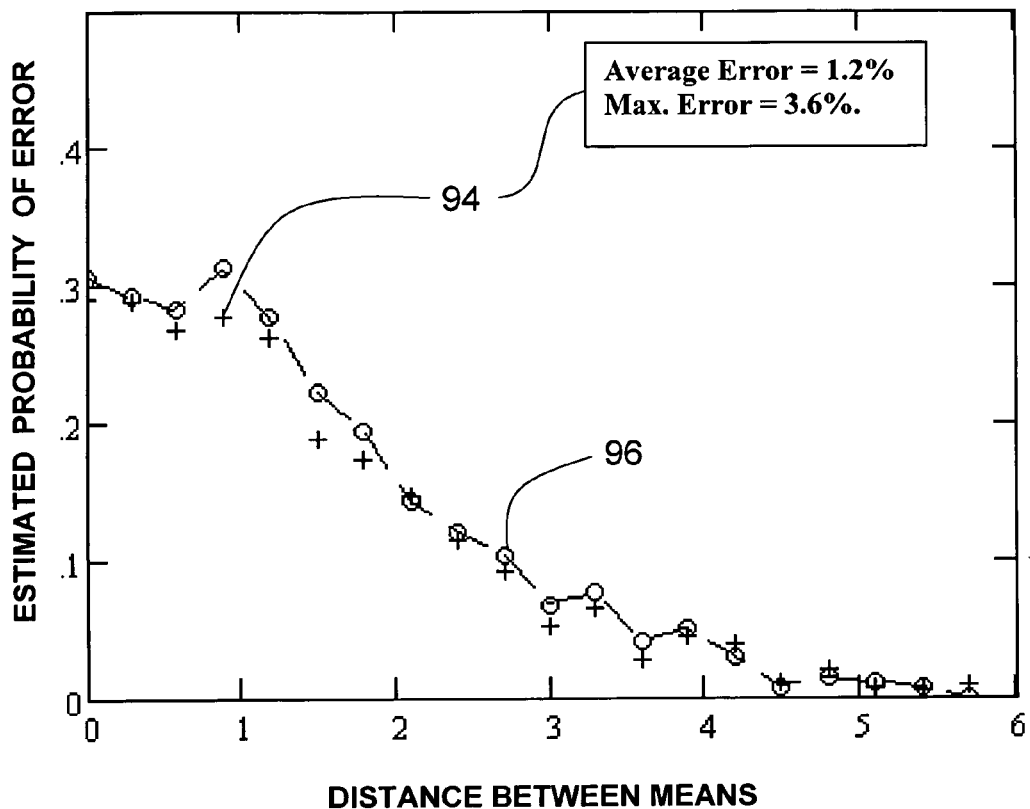

FIG. 10B, shows a plot of the predicted probability of error, 94, and the Gaussian Maximum Likelihood estimate of the probability of error, 96, versus the distance between the means of the two density functions. Again this class-of-interest a priori estimate was obtained using the second embodiment of the A Priori Probability and Probability of Error Estimation system with a Parzen kernel approximation of the class-of-interest posterior probability function. Also shown in FIG. 10B is the average error in the probability of error estimate, PE is 1.3%, 96. This error is the one-standard deviation different between the estimated probability of error, PE, for the adaptive Bayes classifier and the probability of error as measured by the Gaussian Maximum Likelihood classifier, 96. Again referencing FIG. 10B, it can be seen that the maximum error in the probability of error estimate for the adaptive Bayes classifier is 3.6%, 86.

Conclusions from Tests on Simulated Data

From these test results, it can be seen that the two embodiments of the A Priori Probability and Probability of Error Estimation system provides accurate estimates of the class-of-interest a priori probability with average errors that vary between 0.005 and 0.02. In addition, both embodiments provided accurate estimates of the classification error for the adaptive Bayes classifier with errors that differed from the estimates provided by the Gaussian Maximum Likelihood classifier by an average of between 1.2% and 1.3%. Both of these test results were obtained using only labeled samples from the class-of-interest and unlabeled samples from both classes.

CONCLUSIONS, RAMIFICATIONS, AND SCOPE—FIG. 11

Pattern recognition is normally performed in an environment where training samples, or otherwise, is available for all classes. The adaptive Bayes classifier provides a capability to classify data into two classes, a class-of-interest or class-other, in many real world applications where class definitions, through training samples or otherwise, are provided a priori only for the classes-of-interest and the distribution of the class-other is unknown. The performance of the adaptive Bayes classifier is impacted by error in class-of-interest a priori probability estimate used by the adaptive Bayes classifier. The classification accuracy of the adaptive Bayes classifier cannot be estimated using normal procedures for lack of training samples from all the classes. Accordingly the reader will see that the A Priori Probability and Probability of Error Estimation system provides a means for improving the classification accuracy of the adaptive Bayes classifier by providing an accurate estimate of the class-of-interest a priori probability in the data set to be classified. In addition, the A Priori Probability and Probability of Error Estimation system provides a capability for estimating the classification accuracy of the adaptive Bayes classifier in classifying an input-data-set using only labeled training samples form the class-of-interest and unlabeled samples from the input-data-set.

Figure 11:
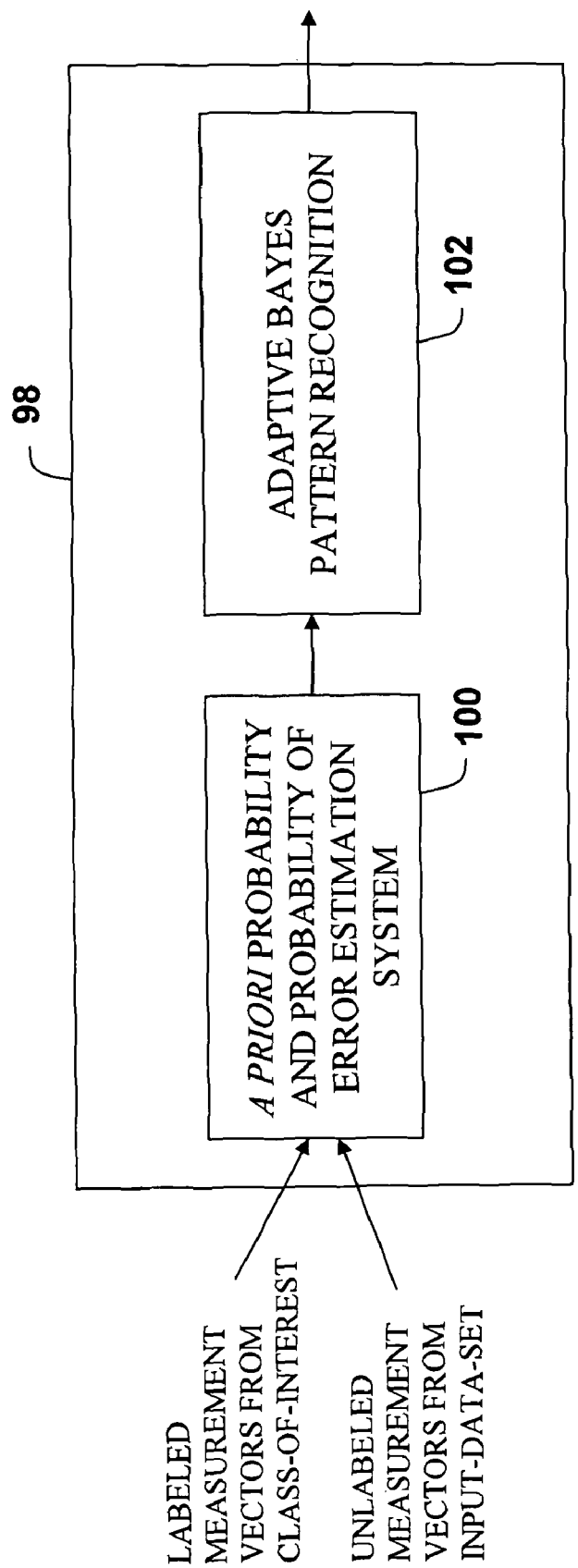
FIG. 11—Shown in FIG. 11 is a pattern recognition system architecture that exploits the capabilities provided by the A Priori Probability and Probability of Error Estimation system.

FIG. 11 shows a pattern recognition system architecture 98 that exploits the capabilities provided by the A Priori Probability and Probability of Error Estimation system. As shown in FIG. 11, the class-of-interest a priori probability estimate provided by the A Priori Probability and Probability of Error Estimation system 100 is utilized by an Adaptive Bayes Pattern Recognition module 102 to classify unlabeled patterns from an input-data-set with minimum error. Again referencing FIG. 11, the A Priori Probability and Probability of Error Estimation system 100 provides the user with an estimate of the performance of the adaptive Bayes classifier in classifying an input-data-set in terms of the probability of error.

The first embodiment of the A Priori Probability and Probability of Error Estimation system 100 provides estimates of the class-of-interest a priori probability and adaptive Bayes classifier performance using a polynomial approximation of the class-of-interest posterior probability function. The second embodiment of the A Priori Probability and Probability of Error Estimation system 100 provides estimates of the class-of-interest a priori probability and adaptive Bayes classifier performance using a Parzen kernel approximation of the class-of-interest posterior probability function.

Examples where the capabilities of the A Priori Probability and Probability of Error Estimation system would be potentially very beneficial can be found in Home Land Security, remote sensing, and target recognition.

Of particular interest since September 11 are biometrics [A. K. Jain, "Biometrics: A Grand Challenge", Proceeding of the $17^{th}$ International Conference on Pattern Recognition, (ICPR '04)] which involves identification of people based on distinctive personal traits (such as facial characteristics, fingerprints, iris patterns, speech patterns). In the USA Patriot Act and the Enhanced Border Security and Visa Entry Reform Act of 2002, the U.S. Congress mandated the use of biometrics in U.S. visas [NIST report to the United States Congress, "Summary of NIST Standards for Biometric Accuracy, Tamper Resistance, and Interoperability." Available at ftp://sequoyah.nist.gov/pub/nist_internal_reports/NISTAPP_Nov02.pdf, November 2002]. This law requires that Embassies and Consulates abroad must now issue to international visitors, "only machine-readable, tamper-resistant visas and other travel and entry documents that use biometric identifiers". Congress also mandated the development of technology that uses these biometric identifiers to positively identify person entering the United States.

In addition, Home Land Security has a need for security screening and surveillance in public spaces to determine the presents of people on a watch-list using facial biometrics [A. K. Jain, "Biometrics: A Grand Challenge", Proceeding of the $17^{th}$ International Conference on Pattern Recognition, (ICPR '04)]. The screening watch-list typically consists of pictures of a few hundred persons. Normally, no a priori knowledge is available of the identities of the other persons observed in the public space that might be mis-identified with people on the watch-list.

In remote sensing applications, ground truth maps, providing prior information on all land cover typologies in an image, do not really describe all the types of land cover types in the image [P. Mantero, "Partially supervised classification of remote sensing images using SVM-based probability density estimation", IEEE Transactions on Geoscience and Remote Sensing, vol. 43, no. 3, March 2005, pp. 559-570]. In addition, one is often interested in identifying picture elements (pixels) belonging to only one or a small number of classes. Generation of a complete training set for all the land cover types in an image is time-consuming, difficult, and expensive.

Target recognition applications [B. Eckstein, "Evaluating the Benefits of assisted Target Recognition", Proceeding of the $30^{th}$ Applied Imagery Pattern recognition Workshop (AIPR"01)] [S. Rizvi, "Fusion Techniques for Automatic Target Recognition", Proceedings of the $32^{nd}$ Applied Imagery Pattern Recognition Workshop (AIPR '03)] often involve recognition of high valued mobile military targets such as tanks in imagery data collected in real time. Often no prior knowledge is available of the other objects in the image which might be confused with a tank, such as decoys (anything that mimics a target but is not a real target), background clutter, man-made structures, and civilian vehicles.

In each of these applications there is a set of labeled training data from the class-of-interest (pictures of persons on a watch-list, land cover types, or high valued military targets). The input-data-set consists of unlabeled measurement vectors from both the class-of-interest and from unknown other-classes. The adaptive Bayes classifier is capable of classifying patterns from these input-data-sets into two classes, ether class-of-interest or class-other. The A Priori Probability and Probability of Error Estimation system provides a system and method for estimating of the a priori probability of the class-of-interest in the input-data-set which can significantly improve the classification accuracy of the adaptive Bayes classifier. The A Priori Probability and Probability of Error Estimation system also provides estimates of the accuracy of the classifications provided by the adaptive Bayes classifier on the input data-set, which is necessary provide confidence in the classification results.

An additional advantage of the A Priori Probability and Probability of Error Estimation system is:

Both embodiments of the A Priori Probability and Probability of Error Estimation system are nonparametric which means that they can provide accurate estimates of both the class-of-interest a priori probability and the performance of the adaptive Bayes classifier without any a priori knowledge of the distributions of the class-of-interest and class-other. However, for the first embodiment, some knowledge of the complexity of the decision boundary is helpful in obtaining optimal results when selecting a polynomial for use in approximating the class-of-interest posterior probability function. In particular, the order of the polynomial (linear, quadratic, etc) used to approximate the class-of-interest posterior probability function also defines the order of the adaptive Bayes decision boundary. Selecting the appropriate order polynomial can improve adaptive Byes classifier performance.

While my above description contains many specificities, these should not be construed as limitations on the scope of the invention, but rather as an exemplification of the presently preferred embodiments. The scope of the embodiment should be determined by appended claims and their legal equivalents, rather than by the examples given.

I claim:

1. A computer implemented method for estimating an a priori probability of a class-of-interest in an input-data-set and for estimating a classification error for an adaptive Bayes classifier in classifying unlabeled patterns from an input-data-set into two classes, a class-of-interest or a class-other, comprising the steps of:

a computer to perform;
receiving a training set of patterns from a class-of-interest, a set of unlabeled patterns from an input-data-set, and a plurality of predetermined of class-of-interest weights with each said class-weight having different predetermined values; and
selecting elements of a predetermined polynomial function; and
executing a training stage using first of said class-of-interest weights, said training set of patterns from said class-of-interest, and said unlabeled patterns from said input-data-set, including a step of estimating a set of weights for said polynomial function elements that ensure a least squares approximation of a weighted class-of-interest posterior probability function using said polynomial function elements, with said training stage repeated to provide said weighted class-of-interest posterior probability functions for each of the remaining said class-of-interest weights; and classifying said patterns from said class-of-interest and said input-data-set into two classes, said class-of-interest or said class-other, in accordance with a conditional test defined by said adaptive Bayes decision rule using first of said weighted class-of-interest posterior probability functions, with said classification repeated using said conditional test defined by an adaptive Bayes decision rule for all remaining said weighted class-of-interest posterior probability functions; and minimizing a least squares criteria to find a plurality of values for class-other probabilities of correct classification that provide identical estimates of said class-of-interest a priori probability; and calculating a value for said class-of-interest a priori probability in said input-data-set using one of said values of said class-other probabilities of correct classification that minimized said least squares criterion, and classifying said patterns from said class-of-interest and said input-data-set into two classes, said class-of-interest or said class-other, using said calculated value of said class-of-interest a priori probability and said conditional test defined by said adaptive Bayes decision rule; and calculating a value for said class-other probability of correct classification from results obtained from said classification of patterns from said class-of-interest and said input-data-set into two classes, said class-of-interest or said class-other, using said conditional test defined by said adaptive Bayes decision rule and said calculated class-of-interest a priori probability; and calculating a value for a probability of error for said adaptive Bayes classifier in classifying patterns from said input-data-set into two classes, said class-of-interest or said class-other, using said calculated value of said class-of-interest a priori probability and said calculated value of said class-other probability of correct classification; and wherein said class-of-interest a priori probability in said input-data-set is estimated and said probability of error for said adaptive Bayes classifier in classifying said input-data-set is estimated using only labeled patterns from said class-of-interest training set, and said unlabeled patterns from said input-data-set, and without any a priori knowledge of said class-other.

2. The method of claim 1 wherein said step of selecting said elements of a predetermined polynomial function includes a step of specifying the elements of a vector, F(X), which defines said polynomial function with said polynomial elements being a function of measurements, or $$F(X) = (f(X)_1, f(X)_2, \ldots f(X)_a)^T$$

where F(X) is a vector containing said polynomial elements, $f(X)_i$, which are functions of measurements.

3. The method of claim 1 wherein said step of executing a training stage using said class-of-interest weight, said training set of patterns from said class-of-interest, and said unlabeled patterns from said input-data-set includes a step of estimating said set of weights for said polynomial elements using the expression $$A_{W_{C_{int}}} = W_{C_{int}} \left[ \frac{1}{N} \sum_{i=1}^{N} (F(X_i)F(X_i)^T) \right]^{-1} \cdot \frac{1}{M} \sum_{j=1}^{M} [F(X_j(C_{int}))]$$

where $$A_{W_{C_{int}}} = (a_1, a_2, \ldots a_R)^T$$

is a vector of said estimated weights for said polynomial elements, $W_{C_{int}}$ is one of said class-of-interest weights, $(X_1, X_2, \ldots X_N)$ are N unlabeled samples from said input-data-set, and $(X_1(C_{int}), X_2(C_{int}), \ldots X_M(C_{int}))$ are M labeled samples from said class-of-interest.

4. The method of claim 1 wherein said step of classifying said patterns from said class-of-interest and said input-data-set into two classes, said class-of-interest or said class-other, in accordance with said conditional test defined by said adaptive Bayes decision rule using said weighted class-of-interest posterior probability function, includes a step of estimating a value for said weighted class-of-interest posterior probability function, $$\hat{P}(C_{int}/X)_{W_{C_{int}}},$$

for said pattern using the expression $$\hat{P}(C_{int}/X)_{W_{C_{int}}} \cong A_{W_{C_{int}}}^T F(X)$$

where $$A_{W_{C_{int}}}$$

is a vector of said estimated weights for said polynomial elements and F(X) is a vector of said polynomial elements.

5. The method of claim 1 wherein said step of classifying said patterns from said class-of-interest and said input-data-set into two classes, said class-of-interest or said class-other, in accordance with said conditional test defined by said adaptive Bayes decision rule using said weighted class-of-interest posterior probability function, $$\hat{P}(C_{int}/X)_{W_{C_{int}}},$$

includes a step of classifying said patterns using following expression $$\text{If: } \hat{P}(C_{C_{int}}/X)W_{C_{int}} \geq 1/2,$$

Classify X as the class-of-interest
Otherwise, classify X as class-other.

6. The method of claim 1 wherein said step of minimizing a least squares criteria to find said plurality of values for said class-other probabilities of correct classification that provide said identical estimates of said class-of-interest a priori probability includes a step of defining said least squares criterion that is appropriate for the number of values of said class-other probabilities of correct classification to be estimated and also includes the step of minimizing said least squares criterion using an optimization procedure.

7. The method of claim 1 wherein said step of calculating said value for said class-of-interest a priori probability, $P_{C_{int}}$, in said input-data-set using one of said values of the class-other probabilities of correct classification, $PCC_{C_{other}}$, that minimized said least squares criterion includes a step of estimating $P_{C_{int}}$ using the expression $$P_{C_{int}} = \frac{PCC_{C_{other}} + PC_{C_{int}} - 1}{PCC_{C_{int}} + PCC_{C_{other}} - 1}$$

where $PCC_{C_{int}}$ is the class-of-interest probability of correct classification, $PC_{C_{int}}$ is the probability of classifying a pattern from said input-data-set as said class-of-interest where $PCC_{C_{int}}$ and $PC_{C_{int}}$ are from the same classification result as $PCC_{C_{other}}$.

8. The method of claim 1 wherein said step of classifying said patterns from said class-of-interest and said input-data-set into two classes, said class-of-interest or said class-other, using said calculated class-of-interest a priori probability and said conditional test defined by said adaptive Bayes decision rule includes a step of estimating a set of weights for said polynomial function elements that ensure a least squares approximation of a class-of-interest posterior probability function using said polynomial function elements using the expression $$A = P_{C_{int}} \left[ \frac{1}{N} \sum_{i=1}^{N} (F(X_i) F(X_i)^T) \right]^{-1} \cdot \frac{1}{M} \sum_{j=1}^{M} [F(X_j(C_{int}))]$$

where $A=(a_1, a_2, \ldots a_R)^T$ is said vector of estimated said weights for said polynomial elements, $P_{C_{int}}$ is said calculated class-of-interest a priori probability, $(X_1, X_2, \ldots X_N)$ are N unlabeled samples from said input-data-set, and $(X_1(C_{int}), X_2(C_{int}), \ldots X_M(C_{int}))$ are M labeled samples from said class-of-interest.

9. The method of claim 1 wherein said step of classifying said patterns from said class-of-interest and said input-data-set into two classes, said class-of-interest or said class-other, using said calculated class-of-interest a priori probability and said conditional test defined by said adaptive Bayes decision rule includes a step of estimating a value for said class-of-interest posterior probability function, $\hat{P}(C_{int}/X)$, for said pattern using the expression $$\hat{P}(C_{int}/X) \approx A^T F(X)$$

where $A=(a_1, a_2, \ldots a_R)^T$ is a vector of said estimated weights for said polynomial elements and $F(X)$ is a vector of said polynomial elements.

10. The method of claim 1 wherein said step of classifying said patterns from said class-of-interest and said input-data-set into two classes, said class-of-interest or said class-other, using said calculated class-of-interest a priori probability and said conditional test defined by said adaptive Bayes decision rule includes a step of classifying said patterns as either said class-of-interest or said class-other based on said value of said class-of-interest posterior probability function, $\hat{P}(C_{int}/X)$, using said conditional test defined by said adaptive Bayes decision rule defined in the following expression $$\text{If:} \hat{P}(C_{C_{int}}/X) \geq \frac{1}{2},$$

Classify X as the class-of-interest
Otherwise, classify X as class-other.

11. The method of claim 1 wherein said step of calculating a value for said class-other probability of correct classification from results obtained from said classification of patterns from said class-of-interest and said input-data-set using said adaptive Bayes classifier and said calculated class-of-interest a priori probability includes a step of calculating said value of class-other probability of correct classification, $PCC_{C_{other}}$, using the expression $$PCC_{C_{other}} = \frac{1}{(PCC_{C_{int}} - 1)} [PC_{C_{int}} + P_{C_{int}}(1 - PCC_{C_{int}}) - 1]$$

where $PCC_{C_{int}}$ and $PC_{C_{int}}$ are estimated from said results obtained from said classification of patterns from said class-of-interest and said input-data-set and $P_{C_{int}}$ is said calculated value of said class-of-interest a priori probability.

12. The method of claim 1 wherein said step calculating a value for a probability of error, PE, for said adaptive Bayes classifier in classifying patterns from said input-data-set into two classes, said class-of-interest or said class-other, using said conditional test defined by said adaptive Bayes decision rule and said calculated class-of-interest a priori probability includes a step of calculating an estimate for a probability of error PE for said adaptive Bayes classifier using the expression $$PE = P_{C_{int}}(1 - PCC_{C_{int}}) + (1 - P_{C_{int}})(1 - PCC_{C_{other}})$$

where $P_{C_{int}}$ is said calculated class-of-interest a priori probability, $PCC_{C_{int}}$ is said class-of-interest probability of correct classification, $PC_{C_{int}}$ is said the probability of classifying a pattern from said input-data-set as said class-of-interest, and $PCC_{C_{other}}$ is said calculated class-other probability of correct classification.

13. A computer implemented method for estimating an a priori probability of a class-of-interest in an input-data-set and for estimating a classification error for an adaptive Bayes classifier in classifying unlabeled patterns from an input-data-set into two classes, a class-of-interest or a class-other, comprising the steps of:

a computer to perform;

receiving a training set of patterns from said class-of-interest, a set of unlabeled patterns from said input-data-set, and a plurality of predetermined of class-of-interest weights with each said class-weight having different predetermined values; and selecting a predetermined number of Gaussian kernel densities functions; and selecting parameter values for said Gaussian kernel densities functions where said selected parameter values cause said Gaussian kernel densities to approximate an unknown input-data-set probability density function; and executing a training stage using first of said class-of-interest weights, said training set of patterns from said class-of-interest, and said unlabeled patterns from said input-data-set, including a step of least squares approximation of a weighted class-of-interest posterior probability function using a linear combination of weighted said Gaussian kernel density functions, with said training stage repeated to provide said weighted class-of-interest posterior probability functions for each of the remaining said class-of-interest weights; and classifying said patterns from said class-of-interest and said input-data-set into two classes, said class-of-interest or said class-other, in accordance with a conditional test defined by an adaptive Bayes decision rule using first of said weighted class-of-interest posterior probability functions, with said classification repeated using said conditional test defined by said adaptive Bayes decision rule for all remaining said weighted class-of-interest posterior probability functions; and minimizing a least squares criteria to find a plurality of values for class-other probabilities of correct classification that provide identical estimates of said class-of-interest a priori probability; and calculating a value for said class-of-interest a priori probability in said input-data-set using one of said values of said class-other probabilities of correct classification that minimized said least squares criteria, and classifying said patterns from said class-of-interest and said input-data-set into two classes, said class-of-interest or said class-other, using said calculated value of said class-of-interest a priori probability and said conditional test defined by said adaptive Bayes decision rule; and calculating a value for said class-other probability of correct classification from results obtained from said classification of patterns from said class-of-interest and said input-data-set into two classes, said class-of-interest or said class-other, using said conditional test defined by said adaptive Bayes decision rule and said calculated class-of-interest a priori probability; and calculating a value for a probability of error for said adaptive Bayes classifier in classifying patterns from said input-data-set into two classes, said class-of-interest or said class-other, using said calculated value of said class-of-interest a priori probability and said calculated value of said class-other probability of correct classification; and wherein said class-of-interest a priori probability in said input-data-set is estimated and said probability of error for said adaptive Bayes classifier in classifying said input-data-set is estimated using only labeled patterns from said class-of-interest training set, and said unlabeled patterns from said input-data-set, and without any a priori knowledge of said class-other.

14. The method of claim 13 wherein said step of a means for selecting parameter values for said Gaussian kernel densities functions where said selected parameter values cause said Gaussian kernel densities to approximate said unknown input-data-set probability density function includes a step of randomly selecting patterns from said input-data-set and setting the mean vector of each said Gaussian kernel density function equal to one of said selected patterns.

15. The method of claim 13 wherein said step of a means for selecting parameter values for said Gaussian kernel densities functions where said selected parameter values cause said Gaussian kernel densities to approximate said unknown input-data-set probability density function includes a step of specifying a kernel smoothing parameter value for each said Gaussian kernel density function, with said kernel smoothing parameter value estimated using the expression $$\hat{H} = \sum_{j=1}^{N} \sum_{i=1}^{R} \frac{\hat{P}_{k_i} \cdot P(X_j/k_i)}{P(X_j)} \cdot \left[\frac{1}{2}(X_j - X_i)(X_j - X_i)^T\right]$$

where $\hat{H}$ is the estimated value for said kernel smoothing parameter value, $\hat{P}_{k_i}$ is the kernel a priori probability, $P(X/k_i)$ is a d-dimension Gaussian form for kernel, $\hat{P}(X)$ is an estimate of the probability of the pattern X in said input-data-set, patterns $(X_1, X_2, \ldots X_N)$ are N unlabeled samples from said input-data-set, and R is the number of Gaussian kernels.

16. The method of claim 13 wherein said step of executing said training stage includes a step of providing a plurality of said weights for each said Gaussian kernel density function.

17. The method of claim 16 wherein said step of providing a plurality of said weights for each said Gaussian kernel density function includes a step of providing a first weight for each said Gaussian kernel density function whose value is equal to the inverse of the probability of said pattern in said input-data-set.

18. The method of claim 16 wherein said step of providing said plurality of said weights for each said Gaussian kernel density function includes a step of providing a second weight for each said Gaussian kernel density function whose value is selected to ensure that said linear combination of Gaussian kernel density functions approximates said weighted class-of-interest posterior probability function, $$\hat{P}(C_{int}/X)_{W_{C_{int}}},$$

in a least squares sense using the expression $$A_{W_{C_{int}}} = W_{C_{int}} \left[\frac{1}{N}\sum_{i=1}^{N}(F(X_i)F(X_i)^T)\right]^{-1} \cdot \frac{1}{M}\sum_{j=1}^{M}[F(X_j(C_{int}))]$$

where $$A_{W_{C_{int}}} = (a_1, a_2, \ldots a_R)^T$$

is a vector of said second weights for said Gaussian kernels, $W_{C_{int}}$ is one of said class-of-interest weights, the patterns $(X_1, X_2, \ldots X_N)$ are N unlabeled samples from said input-data-set, the patterns $(X_1(C_{int}), X_2(C_{int}), \ldots X_M(C_{int}))$ are M labeled samples from said class-of-interest, and the vector $F(X)$ is a set of weighted Gaussian kernels defined as $$F(X) = \left[\frac{P(X/k_1)}{P(X)}, \frac{P(X/k_2)}{P(X)}, \ldots \frac{P(X/k_R)}{P(X)}\right]^T$$

where $P(X/k_i)$ is a Gaussian kernel, or $$P(X/k_i) = \frac{1}{2\pi^{d/2}|H|^{1/2}} e^{-1/2(X-X_i)^T H^{-1}(X-X_i)}$$

and $P(X)$ is said first weight for said Gaussian kernels, or $$P(X) = \frac{1}{R}\sum_{i=1}^{R} P(X/k_i)$$

and R is the number of said weighted Gaussian kernels.

19. The method of claim 13 wherein said step of classifying said patterns from said class-of-interest and said input-dataset into two classes, said class-of-interest or said class-other, in accordance with said conditional test defined by said adaptive Bayes decision rule using said weighted class-of-interest posterior probability function, $$\hat{P}(C_{int}/X)_{W_{C_{int}}},$$

20. The method of claim 19, further includes a step of classifying said patterns using following expression $$\text{If:} \hat{P}(CC_{C_{int}}/X)_{W_{C_{int}}} \geq 1/2,$$

Classify X as the class-of-interest
Otherwise, classify X as class-other.

21. The method of claim 13 wherein said step of minimizing a least squares criteria to find said plurality of values for said class-other probabilities of correct classification that provide said identical estimates of said class-of-interest a priori probability includes a step of defining said least squares criterion that is appropriate for the number of values of said class-other probabilities of correct classification to be estimated and also includes a step of minimizing said least squares criterion using an optimization procedure.

22. The method of claim 13 wherein said step of calculating said value for said class-of-interest a priori probability, $P_{C_{int}}$, in said input-data-set using one of said values of the class-other probabilities of correct classification, $PCC_{C_{other}}$, that minimized said least squares criterion includes a step of estimating $P_{C_{int}}$ using the expression $$P_{C_{int}} = \frac{PCC_{C_{other}} + PC_{C_{int}} - 1}{PCC_{C_{int}} + PCC_{C_{other}} - 1}$$

where $PCC_{C_{int}}$ is the class-of-interest probability of correct classification, $PC_{C_{int}}$ is the probability of classifying a pattern from said input-data-set as said class-of-interest.

23. The method of claim 13 wherein said step of classifying said patterns from said class-of-interest and said input-data-set into two classes, said class-of-interest or said class-other, using said calculated value of said class-of-interest a priori probability and said conditional test defined by said adaptive Bayes decision rule includes a step of providing a updating said second weight for each said Gaussian kernel density function whose value is selected to ensure that said linear combination of Gaussian kernel density functions approximates said class-of-interest posterior probability function, $\hat{P}(C_{int}/X)$, in a least squares sense using the expression $$A = P_{C_{int}} \left[ \frac{1}{N} \sum_{i=1}^{N} (F(X_i) F(X_i)^T) \right]^{-1} \cdot \frac{1}{M} \sum_{j=1}^{M} [F(X_j(C_{int}))]$$

where $A = (a_1, a_2, \ldots a_R)^T$ is a vector of said updated second weights for said Gaussian kernels, $P_{C_{int}}$ is one of said class-of-interest weights, the patterns $(X_1, X_2, \ldots X_N)$ are N unlabeled samples from said input-data-set, the patterns $(X_1(C_{int}), X_2(C_{int}), \ldots X_M(C_{int}))$ are M labeled samples from said class-of-interest, and the vector $F(X)$ is a set of weighted Gaussian kernels defined as $$F(X) = \left[ \frac{P(X/k_1)}{P(X)}, \frac{P(X/k_2)}{P(X)}, \ldots \frac{P(X/k_R)}{P(X)} \right]^T$$

where $P(X/k_i)$ is a Gaussian kernel, or $$P(X/k_i) = \frac{1}{2\pi^{d/2}|H|^{1/2}} e^{-1/2(X-X_i)^T H^{-1}(X-X_i)}$$

and $P(X)$ is said first weight for said Gaussian kernels, or $$P(X) = \frac{1}{R} \sum_{i=1}^{R} P(X/k_i)$$

and R is the number of said weighted Gaussian kernels.

24. The method of claim 13 wherein said step of classifying said patterns from said class-of-interest and said input-data-set into two classes, said class-of-interest or said class-other, using said calculated class-of-interest a priori probability and said conditional test defined by said adaptive Bayes decision rule includes a step of estimating a value for said class-of-interest posterior probability function, $\hat{P}(C_{int}/X)$, for said pattern using the expression $$\hat{P}(C_{int}/X) \cong A^T F(X)$$

where $A = (a_1, a_2, \ldots a_R)^T$ is a vector of said updated second weights for said weighted Gaussian kernels and $F(X)$ is a vector of said polynomial elements.

25. The method of claim 13 wherein said step of classifying said patterns from said class-of-interest and said input-data-set into two classes, said class-of-interest or said class-other, using said calculated class-of-interest a priori probability and said conditional test defined by said adaptive Bayes decision rule includes a step of assigning said patterns as either said class-of-interest or said class-other based on said value of said class-of-interest posterior probability function, $\hat{P}(C_{int}/X)$, using said conditional test defined by said adaptive Bayes decision rule, as defined in the following expression $$\text{If:} \hat{P}(C_{C_{int}}/X) \geq 1/2,$$

Classify X as the class-of-interest
Otherwise, classify X as class-other.

26. The method of claim 13 wherein said step of calculating a value for said class-other probability of correct classification from results obtained from said classification of patterns from said class-of-interest and said input-data-set using said adaptive Bayes classifier and said calculated class-of-interest a priori probability includes a step of calculating said value of class-other probability of correct classification, $PCC_{C_{other}}$, using the expression $$PCC_{C_{other}} = \frac{1}{(PCC_{C_{int}} - 1)} [PC_{C_{int}} + P_{C_{int}} (1 - PCC_{C_{int}}) - 1].$$

27. The method of claim 13 wherein said step calculating a value for a probability of error, PE, for said adaptive Bayes classifier in classifying patterns from said input-data-set into two classes, said class-of-interest or said class-other, using said conditional test defined by said adaptive Bayes decision rule and said calculated class-of-interest a priori probability includes a step of calculating an estimate for a probability of error PE for said adaptive Bayes classifier using the expression $$PE = P_{C_{int}}(1 - PCC_{C_{int}}) + (1 - P_{C_{int}})(1 - PCC_{C_{other}})$$

where $P_{C_{int}}$ is said calculated class-of-interest a priori probability, $PCC_{C_{int}}$ is said class-of-interest probability of correct classification, $PC_{C_{int}}$ is said the probability of classifying a pattern from said input-data-set as said class-of-interest, and $PCC_{C_{other}}$ is said calculated class-other probability of correct classification.

* * * * *